(12) United States Patent
Annamraju et al.

(10) Patent No.: US 12,119,884 B2
(45) Date of Patent: Oct. 15, 2024

(54) AUDIO RECEIVER DEVICE CALIBRATION FOR AUDIO COMMUNICATIONS BETWEEN A BROADCASTER DEVICE AND A RECEIVER DEVICE

(71) Applicant: Google LLC, Mountain View, CA (US)

(72) Inventors: Venu Madhav Annamraju, Telangana (IN); Aviral Gupta, Hyderabad (IN); Heman Khanna, Hyderabad (IN)

(73) Assignee: GOOGLE LLC, Mountain View, CA (US)

( * ) Notice: Subject to any disclaimer, the term of this patent is extended or adjusted under 35 U.S.C. 154(b) by 416 days.

(21) Appl. No.: 16/968,172

(22) PCT Filed: Dec. 14, 2018

(86) PCT No.: PCT/US2018/065766
§ 371 (c)(1),
(2) Date: Aug. 7, 2020

(87) PCT Pub. No.: WO2020/122948
PCT Pub. Date: Jun. 18, 2020

(65) Prior Publication Data
US 2021/0320727 A1    Oct. 14, 2021

(51) Int. Cl.
*H04B 11/00*     (2006.01)
*H04L 65/611*    (2022.01)
*H04W 12/50*     (2021.01)

(52) U.S. Cl.
CPC ............ *H04B 11/00* (2013.01); *H04L 65/611* (2022.05); *H04W 12/50* (2021.01)

(58) Field of Classification Search
CPC ....... H04B 11/00; H04L 65/611; H04L 29/06; H04W 12/50; G06F 3/16; G06F 3/167
See application file for complete search history.

(56) References Cited

U.S. PATENT DOCUMENTS 8,831,680 B2    9/2014  Fa et al.
2013/0301392 A1*  11/2013  Zhao ...................... H04B 11/00
                                                         367/137
(Continued)

FOREIGN PATENT DOCUMENTS

WO    WO 2018/200011    11/2018
WO    WO 2019/040152     2/2019

OTHER PUBLICATIONS

Getreuer et al. ("Ultrasonic Communication Using Consumer Hardware," in IEEE Transactions on Multimedia, vol. 20, No. 6, pp. 1277-1290, Jun. 2018) (Year: 2018).*

(Continued)

*Primary Examiner* — Yuqing Xiao
*Assistant Examiner* — Christopher Richard Walker
(74) *Attorney, Agent, or Firm* — DORITY & MANNING P.A.

(57) ABSTRACT

An operator selects an application on a first user computing device to request a data transfer with a second user computing device. The first user computing device broadcasts an audio token comprising data. The first user computing device activates a microphone component, successively cycles through available audio configurations, applies each selected audio configuration to received audio token data, determines a signal score for each applied audio configuration, and transmits processed audio token data and signal scores to an account management system. The account management system also receives processed audio token data from multiple other computing devices of the same model as the first user computing device. The account management system selects a default audio configuration for the model based on the determined signal scores. The account management system transmits instructions to (Continued)

known computing devices of the model to apply the default
audio configuration to future reception of audio token data.

19 Claims, 9 Drawing Sheets

(56) References Cited

U.S. PATENT DOCUMENTS

| | | |
|---|---|---|
| 2013/0336497 A1 | 12/2013 | Duplan et al. |
| 2014/0280581 A1* | 9/2014 | Hernandez ............ G06F 21/335 709/204 |
| 2014/0369478 A1* | 12/2014 | Brutin ............... H04M 3/42221 379/68 |
| 2015/0095986 A1* | 4/2015 | Karpey ................... H04L 63/08 726/4 |
| 2015/0163278 A1* | 6/2015 | Li ....................... H04L 27/0012 370/474 |
| 2015/0188643 A1* | 7/2015 | Ansell ..................... G10L 15/24 704/205 |
| 2016/0072800 A1* | 3/2016 | Soon-Shiong ......... G16B 50/00 726/7 |
| 2017/0030999 A1* | 2/2017 | Garner ................... G01S 3/801 |
| 2018/0247297 A1* | 8/2018 | Misek ................ G06Q 20/3272 |
| 2018/0255111 A1* | 9/2018 | Zhang ................... H04B 1/713 |

OTHER PUBLICATIONS

International Search Report and Written Opinion for PCT/US2018/065766, mailed on Sep. 5, 2019, 3 pages.

\* cited by examiner

AUDIO RECEIVER DEVICE CALIBRATION FOR AUDIO COMMUNICATIONS BETWEEN A BROADCASTER DEVICE AND A RECEIVER DEVICE

CROSS REFERENCE TO RELATED APPLICATIONS

This application is based upon and claims the right of priority under 35 U.S.C. § 371 to International Application No. PCT/US2018/065766, titled "Audio Receiver Device Calibration for Audio Communications Between a Broadcaster Device and a Receiver Device," filed on Dec. 14, 2018. Applicant claims priority to and the benefit of International Application No. PCT/US2018/065766 and incorporates such application herein by reference in its entirety.

TECHNICAL FIELD

The present disclosure relates generally to pairing computing devices via audio communication and more specifically to calibrating audio receiver devices for audio communication.

BACKGROUND

Broadcaster devices and receiver devices may be paired in close proximity using near-ultrasound audio-based pairing. For audio pairing to be successful at high reliability, receivers of mobile devices need to be configured so that the audio pipeline does not adversely distort and affect the audio data signal. However, the respective audio pre-processing pipeline in each device model that is best suited for near-ultrasound data communication is not known beforehand since chipset as device manufacturers tend to add application specific pre-processing blocks in pipelines such as an anti-aliasing filter pre-processing block, a noise canceller pre-processing block, an automatic gain controller pre-processing block, an acoustic echo canceller pre-processing block, and other pre-processing blocks. Accordingly, many possible configurations exist in devices optimized for specific end-user applications such as a camcorder configuration, a voice recognition configuration, a voice recorder configuration, a cellular configuration, a VoIP call configuration, or other appropriate configurations. While these pre-processing blocks and configurations work optimally for speech and audio applications for which they are intended, they may degrade performance of audio data communication. Therefore, selecting the configuration which performs best for audio data communication becomes essential to high reliability data communication.

Current applications for audio-based pairing do not provide for selecting an optimal receiver device configuration during data communication.

SUMMARY

Techniques herein provide computer-implemented methods to calibrate audio receiver settings of a broadcaster computing device during audio pairing with a receiver computing device, comprising broadcasting audio token data via a speaker component of the first computing device; selecting a first audio receiver configuration from two or more audio receiver configurations; receiving, at a first time, the audio token data via a microphone component; in response to receiving the audio token data at the first time: preprocessing the received audio token data by applying the selected first audio receiver configuration; decoding the audio token data preprocessed according to the selected first audio receiver configuration; and determining a first signal score based on the decoded audio token data preprocessed according to the selected first audio receiver configuration; and transmitting the determined first signal score and the audio token data to one or more computing devices.

In certain other example aspects described herein, systems and computer program products to configure an audio receiver configuration of a broadcaster computing device during audio pairing with a receiver computing device are provided.

These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
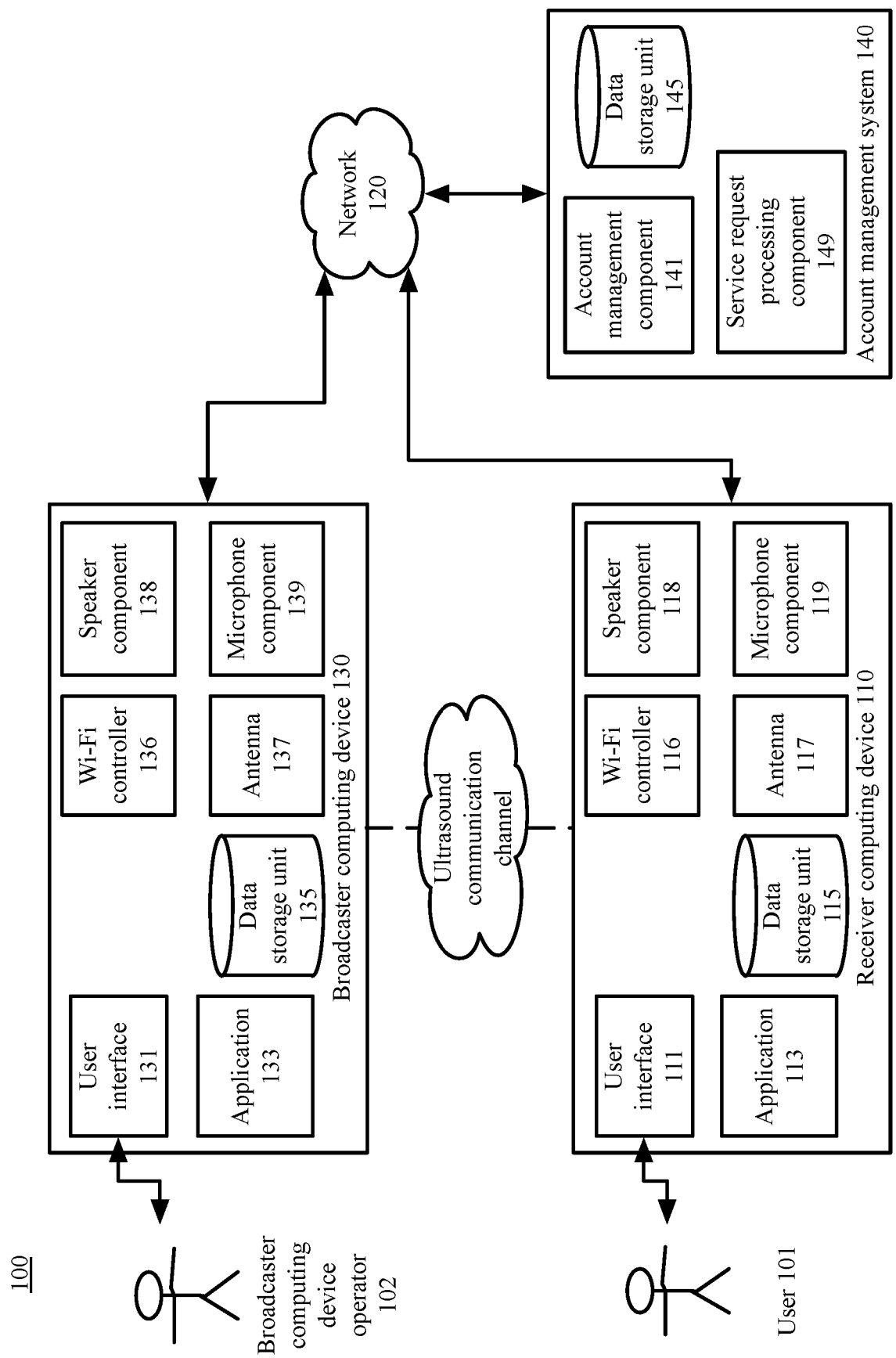
FIG. 1 is a block diagram depicting a system for calibrating, by an account management system, audio receiver settings of a broadcaster computing device during audio pairing with a receiver computing device, in accordance with certain examples.

The examples described herein provide computer-implemented techniques for calibrating, by an account management system, audio receiver settings of a broadcaster computing device during audio pairing with a receiver computing device.

In an example, a broadcaster computing device and a receiver computing device are paired via audio communication and a service request is processed or data is shared between the broadcaster computing device and the receiver computing device via network communication. The broadcaster computing device receives audio token data broadcast by the broadcaster computing device via the microphone component using an initial audio receiver configuration randomly selected from one or more audio receiver configurations available to the broadcaster computing device. The broadcaster computing device determines, based on the processed audio token data, a signal score and stores the signal score. The broadcaster computing device communicates, to the account management system via the network, the processed audio token data and the determined signal score. In an example, the account management system receives the processed audio token data and the determined signal score and associates the signal score with the current audio receiver configuration for the broadcaster computing device model and stores the signal score in a database for the broadcaster computing device model.

If one or more audio receiver configurations different from the current audio receiver configuration are available on the broadcaster computing device, the broadcaster computing device continues to broadcast and receive the audio token data and applies each of the subsequent audio receiver configurations and transmits subsequent signal scores to the account management system. In an example, for each remaining subsequent audio receiver configuration on the broadcaster computing device, the broadcaster computing device continues to broadcast and receive the audio token data, applies each respective subsequent audio receiver configuration randomly selected from among remaining subsequent audio receiver configurations, determines a signal score for each respective remaining subsequent audio receiver configuration, and transmits the respective subsequent processed audio token data along with the respective signal scores to the account management system. The account management system stores each respective subsequent signal score in the database associated with the broadcaster computing device model. For each remaining subsequent audio receiver configuration on the broadcaster computing device, the account management system associates the respective stored subsequent signal score with the respective subsequent audio receiver configuration for the broadcaster computing device in the database for the broadcaster computing device model corresponding to a broadcaster computing device model identifier.

In an example, the account management system receives signal scores for audio token data determined by one or more broadcaster computing devices corresponding to the broadcaster computing device model identifier, the broadcaster computing devices applying one or more audio receiver configurations. The account management system stores the received signal scores in the database for the broadcaster computing device model. The account management system compares all available signal scores from the one or more broadcaster computing devices in the signal score database for the broadcaster computing device model for all available audio receiver configurations. In an example, the account management system calculates an average signal score for signal scores associated with each available audio receiver configuration and selects an available audio receiver configuration having the highest average signal score to be a default audio receiver configuration for the broadcaster computing device model. In another example, the account management system selects an available audio receiver configuration having the highest score of the signal scores stored in the database for the broadcaster computing device model as the default audio receiver configuration for the broadcaster computing device model. In an example, the account management system transmits, to one or more computing devices of the same model as the broadcaster computing device model, instructions to apply the audio receiver configuration having the highest score as a default audio receiver configuration for receiving audio token data.

By using and relying on the methods and systems described herein, one or more broadcaster computing devices and the account management system provide the capability to calibrate a default audio receiver configuration for a broadcaster computing device model to use for pairing via audio communication using aggregate signal score data from multiple computing devices. By using and relying on the methods and systems described herein, the account management system may quickly determine a default audio receiver configuration for a new broadcaster computing device model by comparing signal scores of audio token data received from one or more broadcaster computing devices applying one or more audio receiver configurations to audio token data broadcasted and received at the respective one or more broadcaster computing devices. Each broadcaster computing devices may provide signal scores to the account management system for all possible audio receiver configurations available to the respective broadcaster computing device in a single transmission of an audio token during a service request with a receiver computing device, enabling the account management system to receive signal score data during live audio transmissions for various audio receiver configurations of a device model. Continuously receiving signal score data from subsequent audio pairings to use to determine an optimum audio receiver configuration for a broadcaster computing device model enables the account management system to change the default audio receiver configuration for the broadcaster computing device model as conditions change based on live audio pairing data. As such, the systems and methods described herein may enable speedy determination of an optimum audio receiver configuration of a device model based on data received during live audio transmissions between broadcaster computing devices and receiver computing devices.

Example System Architecture

Turning now to the drawings, in which like numerals indicate like (but not necessarily identical) elements throughout the figures, examples are described in detail.

FIG. 1 is a block diagram depicting a system 100 for configuring, by an account management system 140, a receiver computing device 110 during audio pairing with a broadcasting computing device 130, in accordance with certain examples. As depicted in FIG. 1, the system 100 includes network computing devices 110, 130, and 140 that are configured to communicate with one another via one or more networks 120. In some examples, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 130, and 140 are operated by users 101, broadcaster computing device operators 102, and account management system 140 operators, respectively.

In certain examples, two computing devices comprising a receiver computing device 110 and a broadcaster computing device 130 are paired via audio communication. However, in other examples, a first receiver computing device 110 and a second receiver computing device 110 are paired via audio communication. One or more functions described as being performed by the receiver computing device 110 may also be performed by a first user computing device and one or more functions described as being performed by the broadcaster computing device 130 may also be performed by a second user computing device.

An example receiver computing device 110, or first user computing device, comprises a user interface 111, an application 113, a data storage unit 115, a Wi-Fi controller 116, an antenna 117, an audio component 118, and a microphone component 119. In an example, the receiver computing device 110 receives an audio token via an audio communication channel from a broadcaster computing device 130 with a service request identifier that the receiver computing device 110 can transmit to the account management system 140 via the network 120 to enable network 120 communications between the receiver computing device 110 and the broadcaster computing device 130. An example receiver computing device 110 comprises a broadcaster computing device 130.

In an example, the user interface 111 enables the user 101 to interact with the receiver computing device 110. For example, the user interface 111 may be a touch screen, a voice-based interface, or any other interface that allows the user 101 to provide input and receive output from an application on the receiver computing device 110. In an example, the user 101 interacts via the user interface 111 with the application 113. In an example, the user 101 configures the receiver computing device 110 to receive audio tokens by opening the application 113 and selecting one or more user interface 111 objects.

In an example, the application 113 is a program, function, routine, applet, or similar entity that exists on and performs its operations on the receiver computing device 110. In certain examples, the user 101 must install the application 113 and/or make a feature selection on the receiver computing device 110 to obtain the benefits of the techniques described herein. In an example, the user 101 may access the application 113 on the receiver computing device 110 via the user interface 111. In an example, the application 113 may be associated with the account management system 140. In an example, the application 113, in response to a user 101 input, communicates with the microphone component 119 to activate the microphone component 119 to listen for audio tokens broadcast via audio communication channels. In an example, the application determines a signal score for received audio token data and communicates the signal score to the account management system 140 via the network 120.

In an example, the data storage unit 115 comprises a local or remote data storage structure accessible to the receiver computing device 110 suitable for storing information. In an example, the data storage unit 115 stores encrypted information, such as HTML5 local storage. In an example, the data storage unit 115 stores one or more determined signal scores and is accessible to the application 113. In an example, the application 113 determines signal scores for multiple received audio tokens and stores the signal scores in a data storage unit 115. In this example, the application 113 periodically retrieves stored signal scores and transmits the stored signal scores to the account management system 140 via the network 120.

In an example, the Wi-Fi controller 116 is capable of sending and receiving data, performing authentication and ciphering functions, and directing how the receiver computing device 110 will listen for transmissions from the broadcaster computing device 130 or configuring the receiver computing device 110 into various power-save modes according to Wi-Fi-specified procedures. In another example, the receiver computing device 110 comprises a Bluetooth controller, Bluetooth low energy ("BLE") controller, or an NFC controller capable of performing similar functions. An example Wi-Fi controller 116 communicates with the application 113 and is capable of sending and receiving data over a wireless, Wi-Fi communication channel. In another example, a Bluetooth controller, BLE controller, or NFC controller performs similar functions as the Wi-Fi controller 116 using Bluetooth, BLE, or NFC protocols. In an example, the Wi-Fi controller 116 activates the antenna 117 to create a wireless communication channel between the receiver computing device 110 and the broadcaster computing device 130. For example, the receiver computing device 110 communicates with the broadcaster computing device 130 via the antenna 117. In an example, when the receiver computing device 110 has been activated, the Wi-Fi controller 116 polls through the antenna 117 a radio signal, or listens for radio signals from the broadcaster computing device 130.

In an example, the antenna 117 is a means of communication between the receiver computing device 110 and a broadcaster computing device 130. In an example, a Wi-Fi controller 116 outputs through the antenna 117 a radio signal, or listens for radio signals from the broadcaster computing device 130. In another example a Bluetooth controller or a near field communication ("NFC") controller is used.

In an example, the speaker component 118 comprises a speaker device or other audio device capable of producing an ultrasound output or other audible output. In an example, the speaker component 118 can communicate with the application 113 to receive an instruction to broadcast an ultrasound output. In an example, the speaker component 118 is a component of the receiver computing device 110. In another example, the speaker component 118 is communicatively coupled to the receiver computing device 110.

In an example, the microphone component 119 comprises a microphone device that is capable of receiving ultrasound inputs from an environment of the receiver computing device 110. In an example, the microphone component 119 communicates with the application 113 to receive an instruction to transition from a passive mode to an active mode and listen for ultrasound inputs. In an example, the microphone component 119 receives ultrasound and/or audible sound inputs while in the active mode and transmits the received ultrasound and/or audible sound inputs to the application 113.

An example broadcaster computing device 130, or second user computing device, comprises a user interface 131, an application 133, a data storage unit 135, a Wi-Fi controller 136, an antenna 137, a speaker component 138, and a microphone component 139. In an example, the broadcaster computing device 130 comprises a mobile computing device such as a smartphone device, tablet device, or other mobile computing device. In another example, the broadcaster computing device 130 comprises a point of sale terminal. In an example, the broadcaster computing device 130 communicates a service request identifier to an account management system 140 via the network 120 and also broadcasts the service request identifier in an audio token via audio communication channels to the receiver computing device 110, which transmits the received service request identifier via the network 120 to the account management system 140. In this example, having received the service request identifier from both the broadcaster computing device 130 and the receiver computing device 110, the account management system 140 facilitates network 120 communication between the broadcaster computing device 130 and the receiver computing device 110. An example broadcaster computing device 130 comprises a receiver computing device 110.

In an example, the user interface 131 enables the broadcaster computing device operator 102 to interact with the broadcaster computing device 130. For example, the user interface 131 may be a touch screen, a voice-based interface, or any other interface that allows the broadcaster computing device operator 102 to provide input and receive output from an application on the broadcaster computing device 130. In an example, the broadcaster computing device operator 102 interacts via the user interface 131 with the application 133.

In an example, the application 133 is a program, function, routine, applet, or similar entity that exists on and performs its operations on the broadcaster computing device 130. In certain examples, the broadcaster computing device operator 102 must install the application 133 and/or make a feature selection on the broadcaster computing device 130 to obtain the benefits of the techniques described herein. In an example, the broadcaster computing device operator 102 may access the application 133 on the broadcaster computing device 130 via the user interface 131. In an example, the application 133 may be associated with the account management system 140. In an example, in response to an input of the broadcaster computing device operator 102, the application 133 generates a service request identifier, transmits the service request identifier to the account management system 140 via the network, generates an audio token comprising the service request identifier, and directs the speaker component 118 to broadcast the audio token comprising the service request identifier via audio communication channels. In an example, the application 133, in response to a user 101 input, communicates with the microphone component 139 to activate the microphone component 139 to listen for audio tokens broadcast via audio communication channels. In an example, the application 133 determines a signal score for received audio token data and communicates the signal score to the account management system 140 via the network 120.

In an example, the data storage unit 135 comprises a local or remote data storage structure accessible to the broadcaster computing device 130 suitable for storing information. In an example, the data storage unit 135 stores encrypted information, such as HTML5 local storage. In an example, the data storage unit 135 stores one or more determined signal scores and is accessible to the application 133. In an example, the application 133 determines signal scores for multiple received audio tokens and stores the signal scores in a data storage unit 135. In this example, the application 133 periodically retrieves stored signal scores and transmits the stored signal scores to the account management system 140 via the network 120.

In an example, the Wi-Fi controller 136 is capable of sending and receiving data, performing authentication and ciphering functions, and directing how the broadcaster computing device 130 will listen for transmissions from the receiver computing device 110 or configuring the broadcaster computing device 130 into various power-save modes according to Wi-Fi-specified procedures. In another example, the broadcaster computing device 130 comprises a Bluetooth controller, Bluetooth low energy ("BLE") controller, or an NFC controller capable of performing similar functions. An example Wi-Fi controller 136 communicates with the application 133 and is capable of sending and receiving data over a wireless, Wi-Fi communication channel. In another example, a Bluetooth controller, BLE controller, or NFC controller performs similar functions as the Wi-Fi controller 136 using Bluetooth, BLE, or NFC protocols. In an example, the Wi-Fi controller 136 activates the antenna 137 to create a wireless communication channel between the broadcaster computing device 130 and the receiver computing device 110. For example, the broadcaster computing device 130 communicates with the receiver computing device 110 via the antenna 137. In an example, when the broadcaster computing device 130 has been activated, the Wi-Fi controller 136 polls through the antenna 137 a radio signal, or listens for radio signals from the broadcaster computing device 130.

In an example, the antenna 137 is a means of communication between the broadcaster computing device 130 and the receiver computing device 110. In an example, a Wi-Fi controller 136 outputs through the antenna 137 a radio signal, or listens for radio signals from the receiver computing device 110. In another example a Bluetooth controller or a near field communication ("NFC") controller is used.

In an example, the speaker component 138 comprises a speaker device or other device capable of producing an ultrasound output. In an example, the speaker component 138 can communicate with the application 133 to receive an instruction to broadcast an ultrasound and/or audible sound output. In an example, the speaker component 138 is a component of the broadcaster computing device 130. In another example, the speaker component 138 is communicatively coupled to the broadcaster computing device 130. In an example, the speaker component 138 broadcasts an audio token comprising a service request identifier via one or more audio communication channels.

In an example, the microphone component 139 comprises a microphone device that is capable of receiving ultrasound inputs from an environment of the broadcaster computing device 130. In an example, the microphone component 139 communicates with the application 133 to receive an instruction to transition from a passive mode to an active mode and listen for ultrasound inputs. In an example, the microphone component 139 receives ultrasound and/or audible inputs while in the active mode and transmits the received ultrasound and/or audible inputs to the application 133. In an example, the microphone component 139 receives an audio token broadcast by the broadcaster computing device 130 via the microphone component 139.

An example account management system 140, or service processing system, comprises an account management component 141, a data storage unit 145, and a service request processing component 149. In an example, the account management system 140 receives a service request identifier from the broadcaster computing device 130 and then subsequently receives the service request identifier from the receiver computing device 110. In this example, the broadcaster computing device 130 broadcast an audio token comprising the service request via an ultrasound and/or audible sound output and the receiver computing device 110 received the ultrasound and/or audible sound output via the microphone component 119, extracted the service request identifier from the audio token, and transmitted the service request identifier to the account management system 140. In this example, in response to receiving the service request identifier from both the broadcaster computing device 130 and the receiver computing device 110, the account management system 140 facilitates network 120 communication between the broadcaster computing device 130 and the receiver computing device 110. For example, facilitating communications comprises sending and/or receiving data between the receiver computing device 110 and the broadcaster computing device 130, sending and/or receiving data between the receiver computing device 110 and the account management system 140, sending and/or receiving data between the broadcaster computing device 130 and the account management system 140, sending and/or receiving data between the receiver computing device 110 and a third party processing system, sending and/or receiving data between the broadcaster computing device 130 and a third party processing system, and/or sending and/or receiving data between the account management system 140 and a third party processing system. In an example, the account management system facilitates a transmission via the network 120 of one or more image files, one or more video files, one or more word processing files, one or more other files between the broadcaster computing device 130 and the receiver computing device 110 via the network 120. In examples, the account management system 140 receives, from one or more broadcaster computing devices 130 via the network 120, one or more signal scores associated with one or more audio receiver configurations applied by each respective broadcaster computing device 130 of a broadcaster computing device 130 model to preprocess audio token data received at each respective broadcaster computing device 130. In an example, based on the received signal scores, the account management system 140 determines a best audio receiver configuration for the broadcaster computing device 130 model and transmits instructions, via the network 120, to computing devices of the broadcaster computing device 130 model to apply the determined best audio receiver configuration to receive audio token data in future audio pairings.

In an example, the account management component 141 manages user 101 accounts and service system accounts associated with users 101 and service systems, respectively. In an example, the account management component 141 manages a user 101 account and a broadcaster account associated with users 101 and broadcaster computing device operators 102, respectively. The account management component 141 may receive requests to add, edit, delete, or otherwise modify account information for a user 101 account, service system account, broadcaster account or other appropriate account.

In an example, the data storage unit 145 comprises a local or remote data storage structure accessible to the account management system 140 suitable for storing information. In an example, the data storage unit 145 stores encrypted information, such as HTML5 local storage. In an example, the data storage unit 145 stores one or more received signal scores received from one or more broadcaster computing devices 130. In an example, the data storage unit 145 stores the received signal scores organized according to broadcaster computing device 130 model.

In an example, the service request processing component 149 receives service request details from a broadcaster computing device 130 and information associated with a user 101 account. In an example, the service request processing component 149 transmits a service authorization request to an issuer system through an acquirer system or other appropriate institution associated with the user 101 account information. An example service authorization request may comprise service system account information, user 101 account information, and a total amount of the service request. In an example, after the issuer system processes the service authorization request, the service request processing component 149 receives an approval or denial of the service authorization request from the issuer system over the network 120. In an example, the service request processing component 149 transmits a receipt to the broadcaster computing device 130 and/or the receiver computing device 110 comprising a summary of the service request.

In another example, the service request processing component 149 receives a service request identifier generated by the broadcaster computing device 130, a broadcaster computing device 130 identifier, and service request details from the broadcaster computing device 130. For example, the service request details comprise the total amount of the service request. In an example, the service request processing component identifies a service system account based on the broadcaster computing device 130 identifier and identifies a service system account associated with the service system account for use in the service request. In an example, the service request processing component 149 associates the received service request details, service request identifier and service system account information and stores the associated service request details, service request identifier, and service system account information in a data storage unit 145 or other memory accessible by the account management system 140. In an example, the service request processing component receives the service request identifier from the receiver computing device 110. In this example, the service request processing component 149 extracts the stored service request details and service system account information associated with the service request identifier. In an example, the service request processing component 149 receives a user 101 account identifier based on a selection of the user 101 of the particular account via the user interface 111 of the user computing device 130. In this example, the service request processing component 149 extracts the user 101 account information associated with the account identifier.

An example issuer system approves or denies a service authorization request received from the service computing system or from the account management system 140. In an example, the issuer system communicates with the broadcaster computing device 130 and/or account management system 140 over the network 120. In an example, the issuer system communicates with an acquirer system to approve a credit authorization and to make payment to the account management system 140 and/or service system. For example, the acquirer system is a third party service request processing company.

Figure 9:
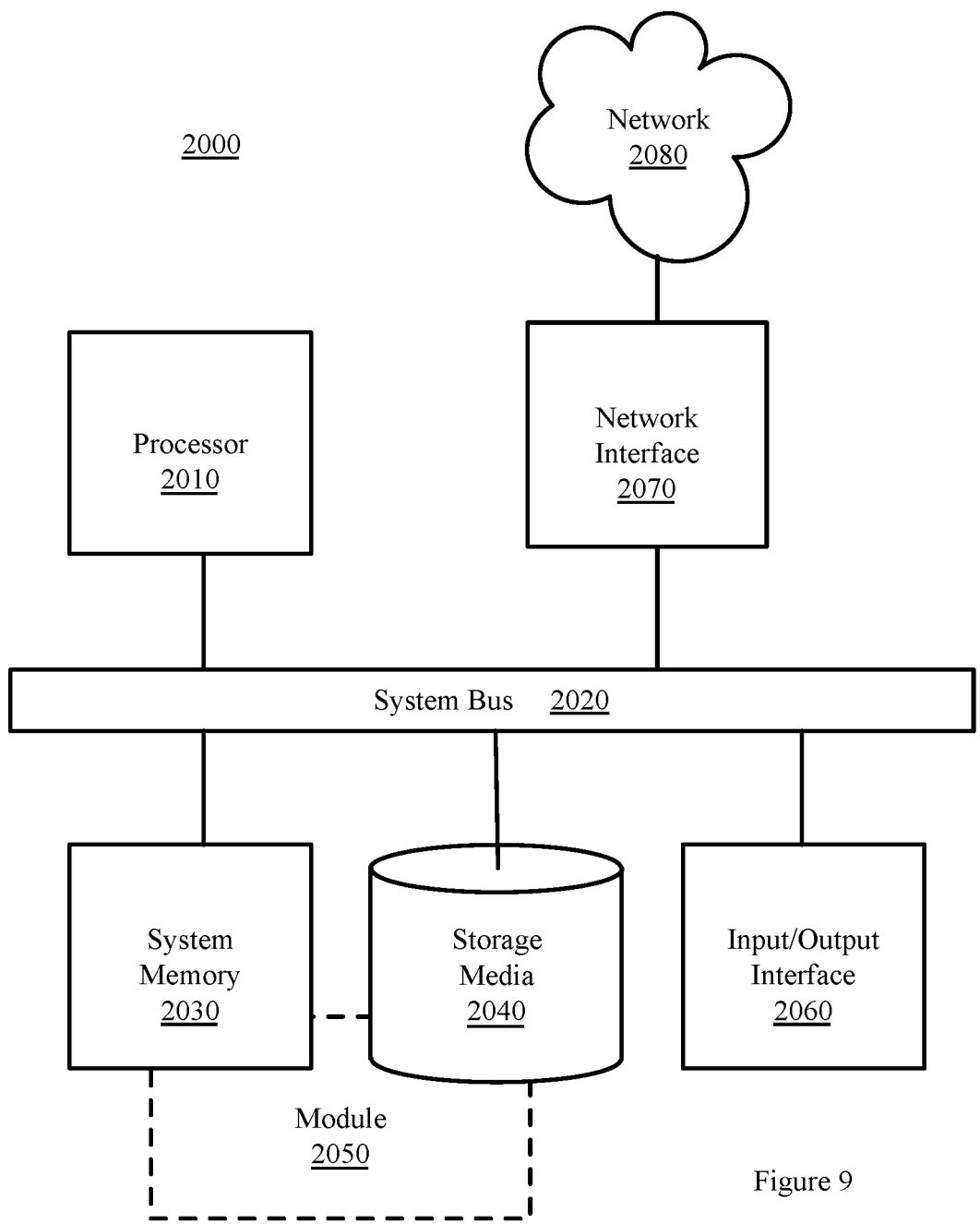
FIG. 9 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 120. The network 120 may include any type of data or communications network, including any of the network technology discussed with respect to FIG. 9.

Example Processes

The example methods illustrated in FIGS. 2-8 are described hereinafter with respect to the components of the example operating environment 100. The example methods of FIGS. 2-8 may also be performed with other systems and in other environments. The operations described with respect to any of the FIGS. 2-8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
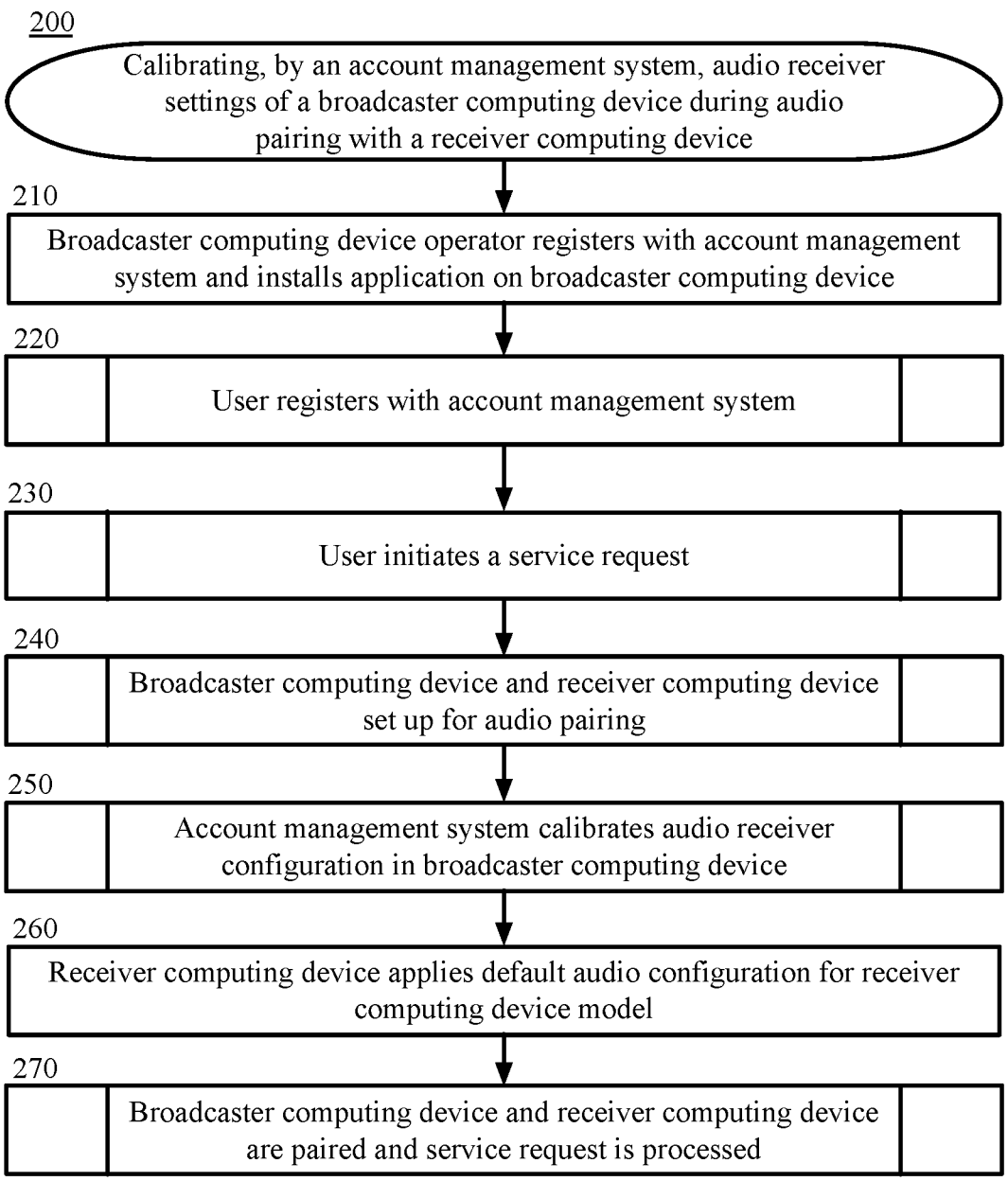
FIG. 2 is a block flow diagram depicting a method for calibrating, by an account management system, audio receiver settings of a broadcaster computing device during audio pairing with a receiver computing device, in accordance with certain examples.

FIG. 2 is a block diagram depicting a method 200 for calibrating, by an account management system 140, audio receiver settings of a broadcaster computing device 130 during audio pairing with a receiver computing device 110, in accordance with certain examples. The method 200 is described with reference to the components illustrated in FIG. 1. In an example, each of multiple broadcaster computing devices 130 receive audio token data broadcast by the respective broadcaster computing device 130 applying one or more audio receiver configurations, determining a signal score corresponding to each applied audio receiver configuration. The account management system compares all available signal scores from the one or more broadcaster computing devices in the signal score database for the broadcaster computing device 130 model for all available audio receiver configurations and selects an available audio receiver configuration having the highest average signal score to be a default audio receiver configuration for the broadcaster computing device 130 model. In an example, the account management system transmits, to one or more computing devices of the same model as the broadcaster computing device model, instructions to apply the audio receiver configuration having the highest score as a default audio receiver configuration for receiving audio token data.

In block 210, the broadcaster computing device operator 102 registers with the account management system 140. In an example, the broadcaster computing device operator 102 is an agent of a service system and registers for a merchant account with the account management system 140 via a website of the account management system 140. In another example, the agent of the service system may comprise a user other than the broadcaster computing device operator 102. In an example, a broadcaster computing device operator 102 installs the application 133 on the broadcaster computing device 130. In another example, the broadcaster computing device operator 102 purchases a broadcaster computing device 130 from the account management system 140 or otherwise obtains the broadcaster computing device 130 with the application 133 pre-installed on the broadcaster computing device 130. In an example, the broadcaster computing device 130 is able to communicate with one or more broadcaster computing devices 110, the account management system 140, one or more issuer systems, and one or more acquirer systems over a network 120. In an example, the broadcaster computing device 130 communicates with the account management system 140 via the application 113 over the network 120. In certain examples, the broadcaster computing device 130 may be able to transmit service request details and a broadcaster computing device 130 identifier to the account management system 140 via the application 113 over the network 120 to enable the account management system 140 to process a service request. In an example, the broadcaster computing device 130 is able to receive receipts from the account management system 140 that notifies a broadcaster computing device operator 102 as to whether a service request was successful or not. In an example, the broadcaster computing device 130 comprises a mobile computing device, for example, a mobile computing device, a tablet computing device, a wearable computing device, a laptop computing device, a point of sale terminal, or other computing device.

In block 220, the user 101 registers with the account management system 140. The method for registering, by a user 101, for an account with an account management system 140 is described in more detail hereinafter with reference to the method described in FIG. 3.

Figure 3:
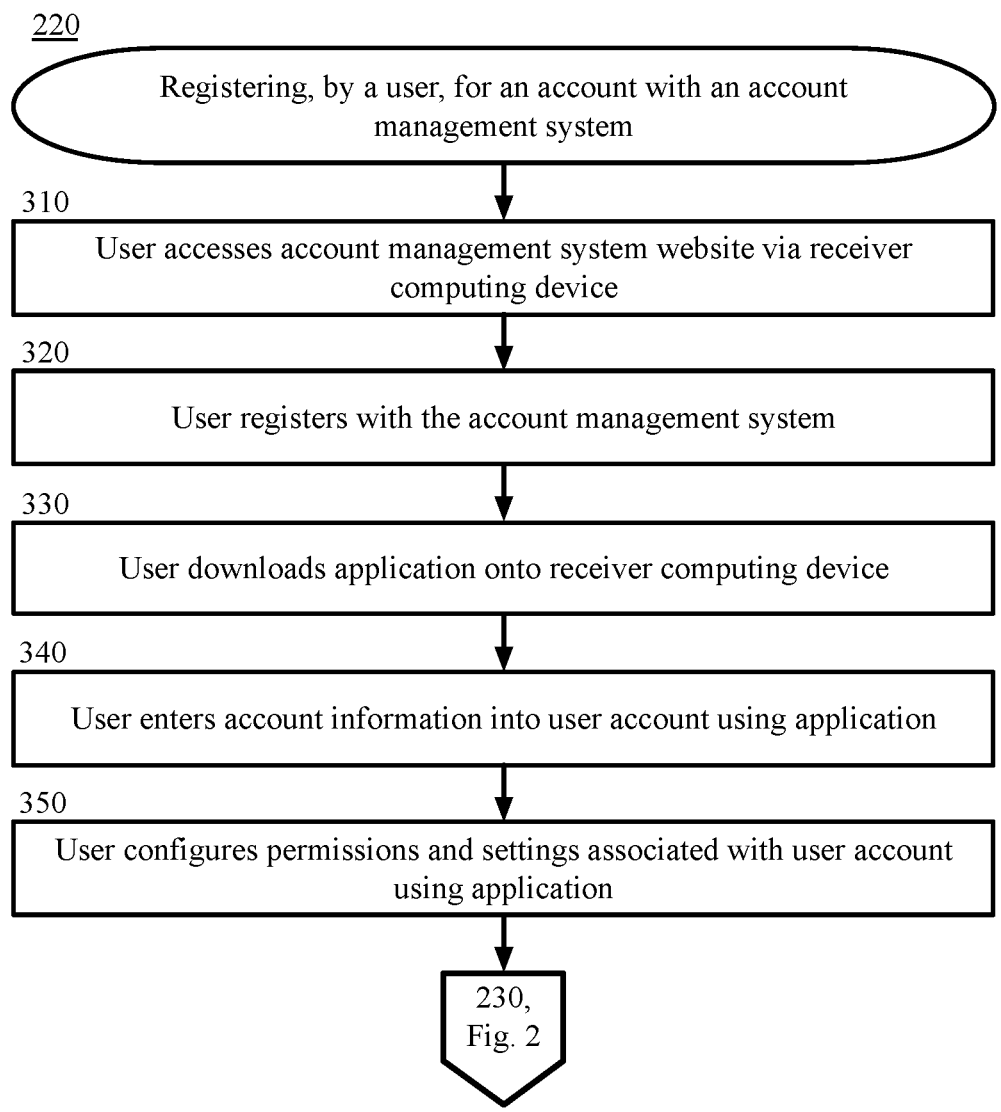
FIG. 3 is a block flow diagram depicting a method for registering, by a user, for an account with an account management system, in accordance with certain examples.

FIG. 3 is a block diagram depicting a method 220 for registering, by a user 101, for an account with an account management system 140, in accordance with certain examples. The method 220 is described with reference to the components illustrated in FIG. 1. In an example, a user 101 account comprises user 101 data. In an example, a user 101 registers with an account management system 140 for a user 101 account and downloads an application 113 onto the receiver computing device 110.

In block 310, the user accesses an account management system 140 website via the receiver computing device 110. For example, the user 101 accesses the account management system 140 website via a web browser of the receiver computing device 110. In another example, the user 101 may otherwise contact the account management system 140 to register for a user 101 account.

In block 320, the user 101 registers with the account management system 140. The user 101 may obtain a user 101 account number, receive the appropriate applications and software to install on the receiver computing device 110 or perform any action provided by the account management system 140. The user 101 may utilize the functions of the receiver computing device 110, such as the user interface 111 and the web browser, to register and configure a user 101 account.

In block 330, the user 101 downloads an application 113 onto the receiver computing device 110. In an example, the application 113 operating on the receiver computing device 110 is able to communicate with the account management system 140 over the network 120.

In block 340, the user 101 enters account information into the user 101 account using the application 113. In an example, the user 101 may enter account information associated with one or more user 101 accounts, for example, one or more credit accounts, one or more bank accounts, one or more stored value accounts, and/or other appropriate accounts into the user 101 account maintained by the account management system 140.

In block 350, the user 101 configures permissions and settings associated with the user 101 account using the application 113. In an example, the user 101 may configure user 101 account settings or add, delete, or edit account information via the application 113. In an example, the user 101 may select an option to enable or disable the permission of the account management system 140 to process service requests.

From block 350, the method 220 proceeds to block 230 in FIG. 2.

Returning to FIG. 2, in block 230, the user 101 initiates a service request at the broadcaster computing device 130. For example, a service request comprises a payment transaction. The method for initiating, by a user 101, a service request at a broadcaster computing device 130 is described in more detail hereinafter with reference to the method described in FIG. 4.

Figure 4:
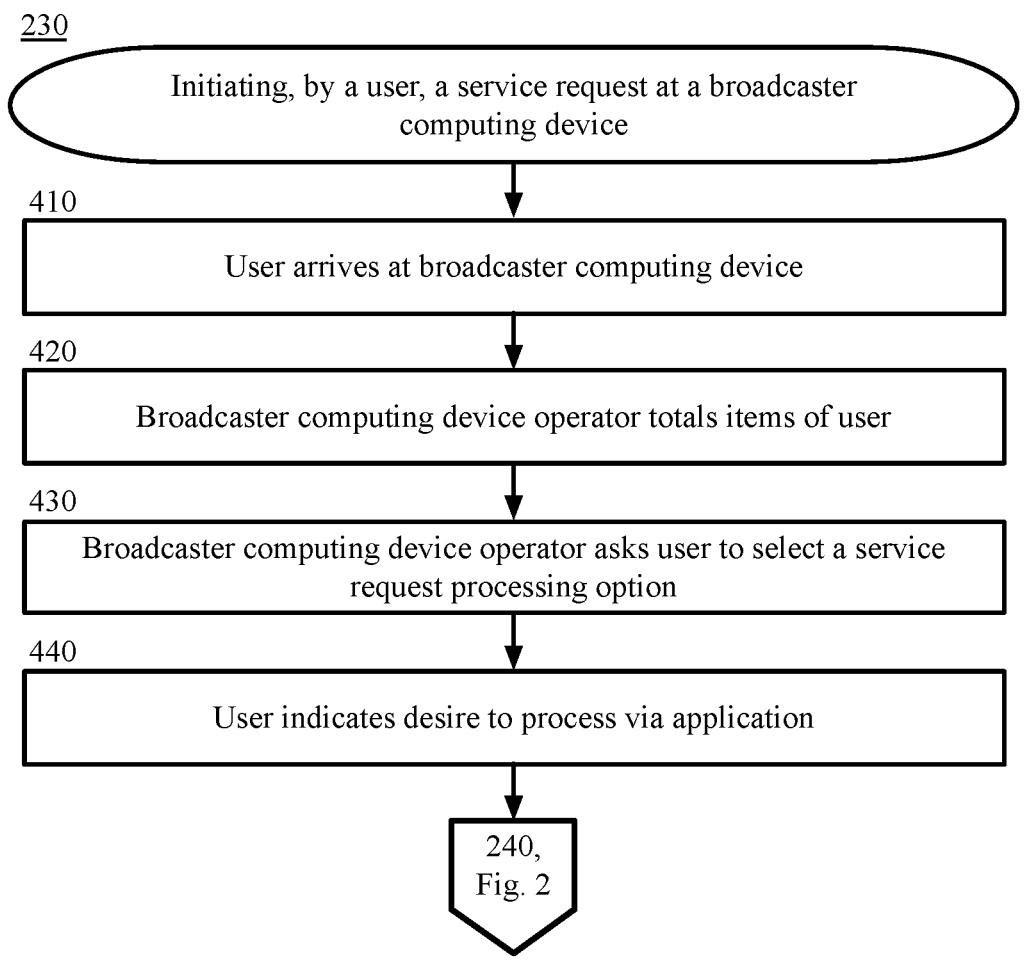
FIG. 4 is a block flow diagram depicting a method for initiating, by a user, a service request at a broadcaster computing device, in accordance with certain examples.

FIG. 4 is a block diagram depicting a method 230 for initiating, by a user 101, a service request at a broadcaster computing device 130, in accordance with certain examples. The method 230 is described with reference to the components illustrated in FIG. 1. In an example, a service request comprises a request to transmit data between the broadcaster computing device 130 and the receiver computing device 110. In an example, the service request comprises a request to receive data from the receiver computing device 110 onto the broadcaster computing device 130. In an example, the service request comprises a request to process a service request by the account management system 140 using data associated with an account of a user 101 associated with the receiver computing device 110 and an account associated with the broadcaster computing device 130.

In block 410, the user 101 arrives at the broadcaster computing device 130. In an example, at a time prior to approaching the broadcaster computing device 130, the user 101 browses the service system location and selects one or more items to purchase. In this example, the user 101 may collect the one or more items and carry, or otherwise transport via physical basket or shopping cart, the one or more items to the broadcaster computing device 130. In this example, the user 101 carries or otherwise has in his possession the receiver computing device 110.

In block 420, the broadcaster computing device operator 102 totals items of the user 101 for purchase. In an example, the broadcaster computing device operator 102 scans barcodes associated with the one or more items of the user 101 or otherwise enters information associated with the items into the broadcaster computing device 130.

In block 430, the broadcaster computing device operator 102 asks the user 101 to select a service request processing option. In an example, the broadcaster computing device 130 displays one or more account options that the user 101 may select to use in a service request. Example service request processing options may comprise use of an application 133 associated with the account management system 140 with which both the user 101 and the service system have an account, a payment by cash, a payment by check, a payment by credit card, a payment by debit card, another means of payment that the service system can or is willing to accept for payment from the user 101, and other service request processing options. In an example, the one or more service request processing options are displayed as objects on the user interface 131 and are selectable by the broadcaster computing device operator 102 in response to the user 101 directing the broadcaster computing device operator 102 to make a selection via the user interface 131 of the broadcaster computing device 130. In an example, the broadcaster computing device operator 102 may ask the user 101 if the user 101 wishes to conduct a service request using the account of the user 101 associated with the account management system 140.

In block 440, the user 101 indicates a desire to pay via the application 133. For example, the user 101 directs the broadcaster computing device operator 102 to initiate a service request via the application 133.

From block 440, the method 230 proceeds to block 240 in FIG. 2.

Returning to FIG. 2, in block 240, the broadcaster computing device 130 and the receiver computing device 110 are set up for audio pairing. Methods for setting up a broadcaster computing device 130 and a receiver computing device 110 for audio pairing are described in more detail hereinafter with reference to the method described in FIG. 5.

Figure 5:
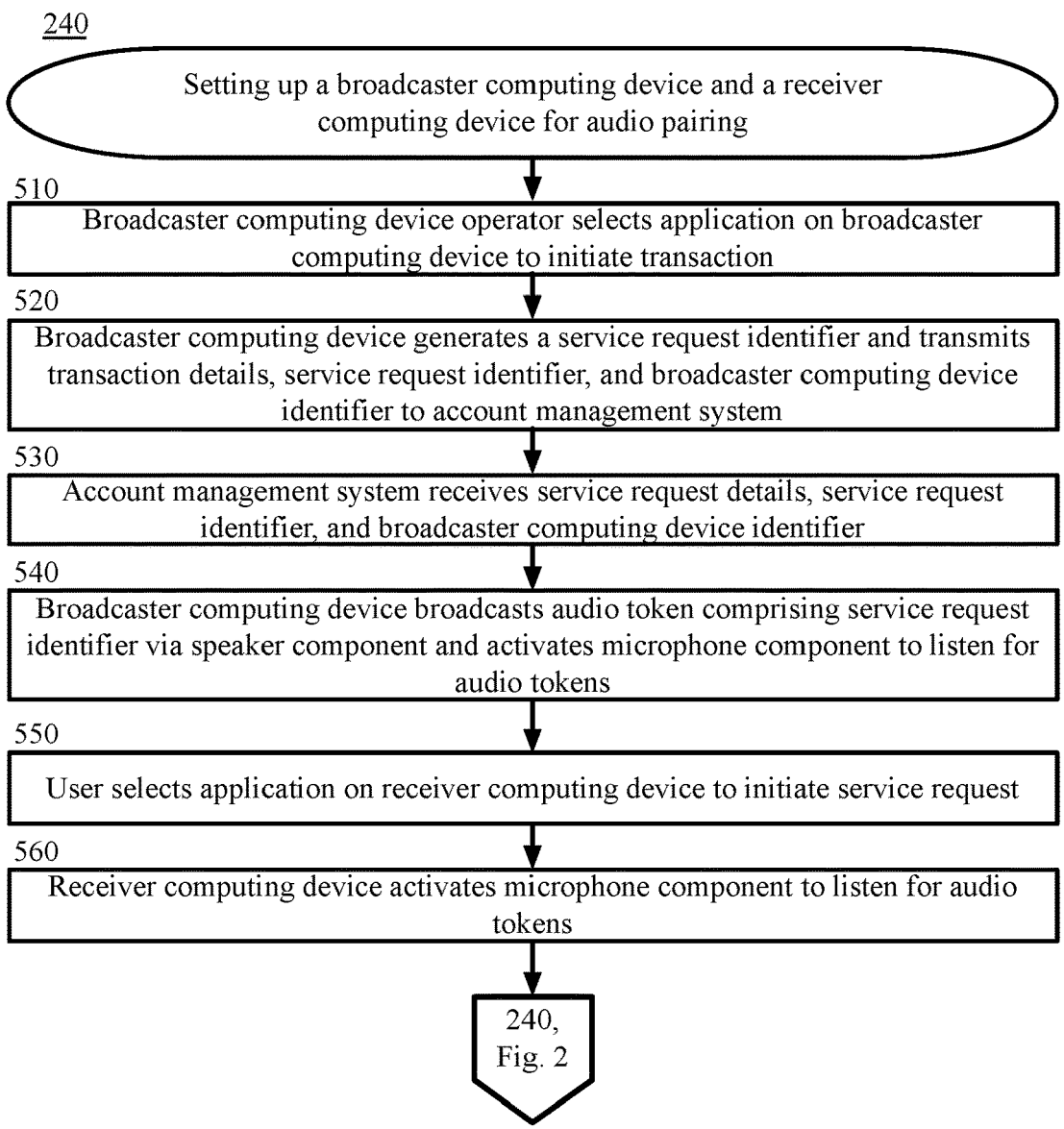
FIG. 5 is a block flow diagram depicting a method for setting up a broadcaster computing device and a receiver computing device for audio pairing, in accordance with certain examples.

FIG. 5 is a block diagram depicting a method 240 for setting up a broadcaster computing device 130 and a receiver computing device 110 for audio pairing, in accordance with certain examples. The method 240 is described with reference to the components illustrated in FIG. 1. In examples, the broadcaster computing device 130 is configured to broadcast an audio token comprising a service request identifier and the receiver computing device 110 is configured to receive the broadcast audio token and communicate the service request identifier to the account management system 140

In block 510, the broadcaster computing device operator 102 selects the application 133 on the broadcaster computing device 130 to initiate a service request. In an example, in response to receiving a verbal request from the user 101 to select the application 133 as a service request processing option, the broadcaster computing device operator 102 actuates an object on the user interface 131 of the broadcaster computing device 130 corresponding to the application 133 as a service request processing option.

In block 520, the broadcaster computing device 130 generates a service request identifier and transmits service request details, a service request identifier, and a broadcaster computing device 130 identifier to the account management system 140. In an example, the broadcaster computing device 130 generates the service request identifier via a random number generator of the application 133. In an example, the service request identifier comprises a string of alphanumeric and/or symbolic characters. In an example, service request details comprise a total amount for the service request and/or a listing of the one or more items being purchased by the user 101. In an example, the broadcaster computing device 130 identifier comprises a media access control ("MAC") address, hardware identifier, or other identifier associated with the broadcaster computing device 130. In this example, the account management system 140 is able to identify a service system account based on the broadcaster computing device 130 identifier. In an example, the broadcaster computing device 30 transmits the service request details, the service request identifier, and the broadcaster computing device 130 identifier to the account management system 140 via the network 120.

In block 530, the account management system 140 receives the service request details, the service request identifier, and the broadcaster computing device 130 identifier. For example, the account management system 140 receives the service request details, the service request identifier, and the broadcaster computing device 130 identifier via the network 120. For example, the service request identifier is a random number generated by the broadcaster computing device 130 and transmitted along with the broadcaster computing device 130 identifier and service request details comprising the total amount of the service request for the one or more items being purchased by the user 101. In an example, the account management system 140 identifies a service system account identifier associated with the service system based on the broadcaster computing device 130 identifier. For example, the account management system 140, at the time the service system creates an account with the account management system 140, associates the broadcaster computing device 130 identifier with an account identifier associated with the service system account and stores the association of the service system account identifier and the broadcaster computing device 130 identifier in a database or data storage unit 146 accessible to the account management system 140. In this example, upon receiving the broadcaster computing device 130 identifier, the service request details, and the service request identifier, the account management system 140 determines the service system account identifier by accessing the database and extracting the service system account identifier associated with the broadcaster computing device 130 identifier. In an example, the account management system 140 stores the service request identifier, the service system account identifier, and the service request details in a database or in the data storage unit 146 accessible to the account management system 140. In this example, the account management system 140 may associate the service request identifier with the service system account identifier and the service request details, for example, by storing the data in a table or other format.

In block 540, the broadcaster computing device 130 broadcasts an audio token comprising the service request identifier and the broadcaster computing device 130 identifier. In an example, in response to receiving an input of a selection of a user interface 133 object displayed by the application 133 and in response to generating the service request identifier and transmitting the service request identifier to the account management system 140, the broadcaster computing device 130 broadcasts the audio token comprising the service request n identifier via audio communication channels. Broadcasting the audio token may comprise broadcasting the audio token via ultrasound communication, audible sound communication, or other sound communication. For example, as previously discussed, the broadcaster computing device 130 previously transmitted the service request identifier along with service request details to the account management system 140. In an example, the broadcaster computing device 130 broadcasts the audio token via ultrasound communication. The broadcaster computing device 130 may encrypt the audio token using a key shared with the account management system 140 and broadcast an encrypted audio token via audio communication channels.

In certain other examples, the broadcaster computing device 130 does not broadcast the audio token but instead broadcasts a token comprising the service request identifier via Wi-Fi communication, Bluetooth communication, Bluetooth low-energy communication, light or optical communication, or other appropriate means of communication. In an example, the broadcaster computing device 130 continues to broadcast the audio token, Wi-Fi token, Bluetooth token, Bluetooth low-energy token, light or optical token, or other token for a threshold length of time and ceases to broadcast the audio token after the threshold length of time has passed. In an example, the threshold length of time comprises ten seconds or another appropriate length of time. In an example, the token does not comprise a service request identifier but instead comprises other data such as files, images, text, applications, or other data. In these other examples, the broadcaster computing device 130 or second computing device broadcasts the token or audio token in response to receiving an input via the user interface 131 instructing the broadcaster computing device 130 to pair with a receiver computing device 110. For example, the input comprises a selection, via the user interface 131 by the operator of the broadcaster computing device 130 of an option to initiate a service request or to initiate a transfer of data.

In block 550, the user 101 selects the application 113 on the receiver computing device 110 to initiate the service request. In an example, the broadcaster computing device operator 102 actuates one or more objects on the user interface 111 of the receiver computing device 110 corresponding to the application 113 to initiate a service request.

In block 560, the receiver computing device 110 activates a microphone component 119. In an example, the receiver computing device 110 logs a timestamp at the time the receiver computing device 110 activates the microphone component 119 and instructs the microphone component 119 to listen for audio tokens until a predefined threshold length of time passes from the time indicated on the timestamp. In an example, after the threshold length of time passes, the receiver computing device 110 deactivates the microphone component 119 or otherwise instructs the microphone component 119 to cease listening for audio tokens broadcast by the broadcaster computing device 130. In another example, the receiver computing device 110, in response to receiving the input from the user 101, activates a component of the receiver computing device 110 able to receive the token broadcast by the broadcaster computing device 130 over the communication medium utilized by the broadcaster computing device 130 to broadcast the token. For example, the user computing device 130 activates a Wi-Fi controller, a Bluetooth controller, Bluetooth low-energy controller, a component to receive light or optical communication, or other component capable of receiving the token over the same transfer medium used by the broadcaster computing device 130 to broadcast the token. In certain examples, in response to receiving the alert from the proximity sensor component 114, the receiver computing device 110 opens or otherwise activates the application 113, which communicates with appropriate component of the receiver computing device 110 capable of receiving the token over the same transfer medium used by the broadcaster computing device 130 to broadcast the token.

From block 560, the method 240 proceeds to block 250 in FIG. 2.

Returning to FIG. 2, in block 250, the account management system 140 calibrates an audio receiver configuration for the broadcaster computing device 130. Methods for calibrating, by an account management system 140, an auduring audio pairing are dedio receiver configuration for a broadcaster computing device 110 during audio pairing is described in more detail hereinafter with reference to the method described in FIG. 6.

Figure 6:
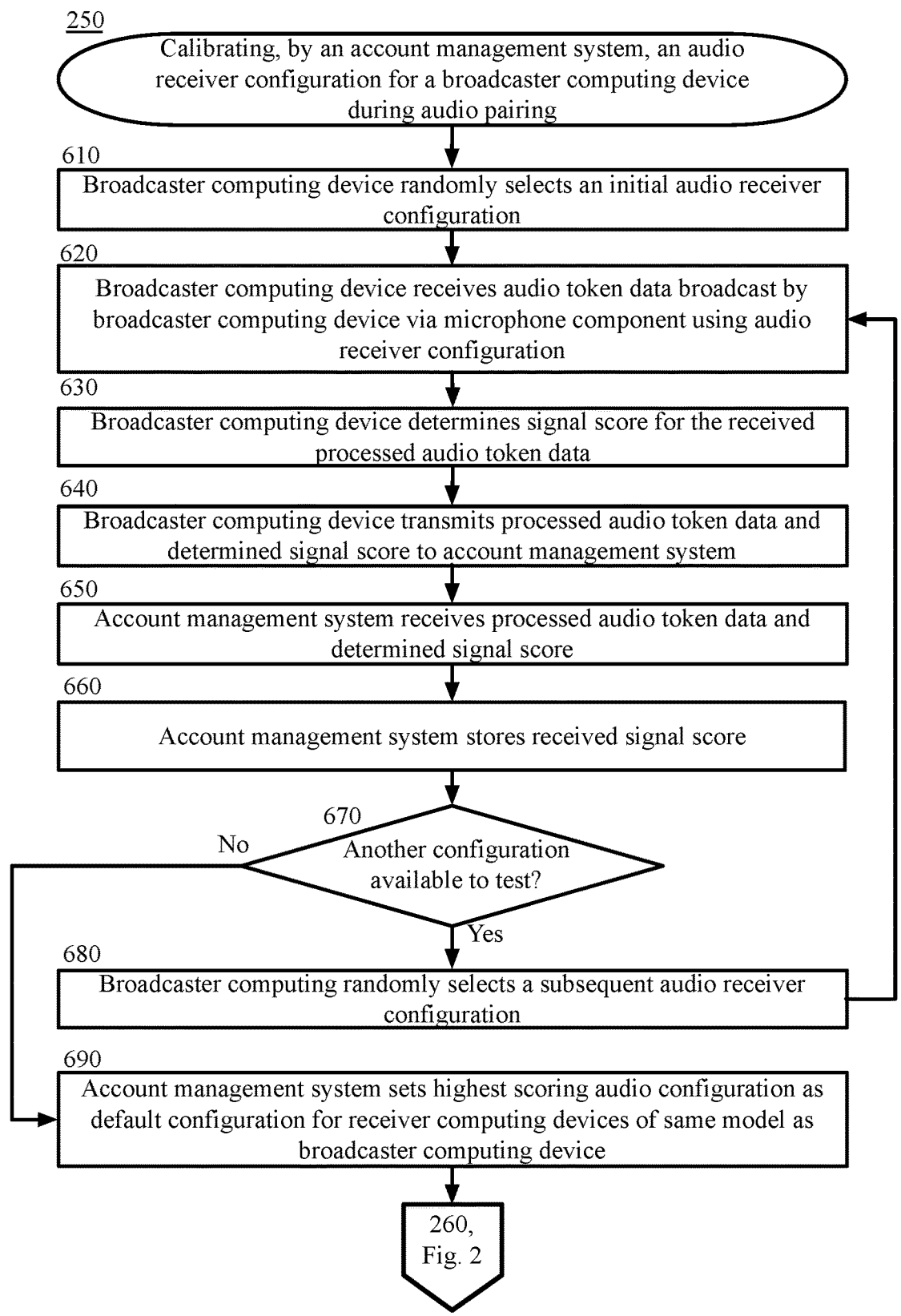
FIG. 6 is a block flow diagram depicting a method for calibrating, by an account management system, an audio receiver configuration for a broadcaster computing device during audio pairing, in accordance with certain examples.

FIG. 6 is a block diagram depicting a method 250 for calibrating, by an account management system 140, an audio receiver configuration for a broadcaster computing device 130 during audio pairing, in accordance with certain examples. The method 250 is described with reference to the components illustrated in FIG. 1. In the examples described herein, the account management system 140 calibrates an audio receiver configuration for a broadcasting computing device 130 during a service request. In an example, the account management system 140 calibrates, selects, or determines a default audio receiver configuration for a broadcaster computing device 130 model so that broadcaster computing devices 130 of the model receive audio token data according to the default audio receiver configuration. In an example the determined default audio receiver configuration provides the best, most clear reception of audio token data for receiver computing devices 110 of the broadcaster computing device 130 model.

In block 610, the broadcaster computing device 130 randomly selects an initial audio configuration. In an example, the broadcaster computing device 130 operating system comprises one or more possible audio configurations for specific end-user applications, for example, a camcorder configuration, a voice recognition configuration, a voice recorder configuration, a cellular configuration, a voice over IP ("VoIP") call configuration, and other appropriate audio configurations. By applying an audio configuration, the broadcaster computing device 130 pre-processes incoming sound input from the microphone component 119. Pre-processing sound input may include applying one or more parameters such as automatic gain control, noise cancelation, anti-aliasing filter, acoustic echo canceller, mono input variations, stereo input variations, and other preprocessing steps to generate a modified sound input from the original incoming sound input.

In an example, the broadcaster computing device 130 randomly selects an audio receiver configuration from one or more audio receiver configurations available to the broadcaster computing device 130. In another example, the broadcaster computing device 130 selects a first configuration from a list of the one or more audio receiver configurations available to the broadcaster computing device 130. In another example, the broadcaster computing device 130 is programmed with a default audio receiver configuration and selects the default audio receiver configuration. For example, the broadcaster computing device 130 comprises audio receiver configurations comprising a camcorder configuration, a voice recognition configuration, a voice recorder configuration, a cellular configuration, a voice over IP ("VoIP") call configuration and randomly selects the voice recognition configuration as the initial audio receiver configuration.

In block 620, the broadcaster computing device 130 receives, via the microphone component 139, audio token data broadcast by the broadcaster computing device 130 using the initial audio receiver configuration. In an example, the broadcaster computing device 130 activates the microphone component 139 and receives, via the microphone component 139, audio token data broadcast by the receiver computing device 130 using the selected initial audio receiver configuration.

For example, when the broadcaster computing device 130 receives sound input in the camcorder configuration, the broadcaster computing device 130 may apply automatic gain control to amplify the volume of the incoming sound input and may apply a noise cancelation algorithm to reduce background noise in the incoming sound input. In an example, when the broadcaster computing device 130 receives sound input in the voice recognition configuration, the broadcaster computing device 130 does not apply noise cancelation and automatic gain control to the sound input. In an example, the broadcaster computing device 130 applies either a mono configuration or stereo configuration. In an example, the broadcaster computing device 130 applies a mono configuration or stereo configuration that restricts sound input to input received via a left, a right, a front, and/or a back region of the microphone component 139 or microphone device communicatively coupled to the microphone component 139. In certain examples, the broadcaster computing device 130 does not pre-process incoming sound input. For example, when the broadcaster computing device 130 receives sound input in the unprocessed configuration, the broadcaster computing device 130 does not edit or otherwise preprocess incoming sound input.

In block 630, the broadcaster computing device 130 determines a signal score for the received processed audio token data. In certain examples, determining a signal score for received audio token data from a broadcaster computing device comprises measuring, by the broadcaster computing device 130, an energy value for received audio token data after applying a series of decoding processes to audio token data. In an example, the broadcaster computing device 130, before broadcasting the audio token data via an audio communication channel, encrypts the audio token data, applies a pedestal offset to the audio token data, and applies a direct sequence spread spectrum modulation technique to the encrypted offset audio token data to broadcast modulated encrypted offset audio token data via audio communication. An example direct sequence spread spectrum modulation technique comprises multiplying the audio token data by a pseudo noise digital signal and applying a radio frequency carrier. For example, the radio frequency carrier shifts modulated encrypted offset audio token data up to a certain frequency, for example, 18.5 kHz. When the broadcaster computing device 130 receives the broadcast modulated encrypted offset audio token data via the microphone component 139, the broadcaster computing device 130 performs a despreading operation on the received audio token to determine the encrypted offset audio token data. An example despreading operation reverses the direct sequence spread spectrum modulation technique applied before the token was broadcast and removes the pseudo noise digital signal and radio frequency carrier. The broadcaster computing device 130 finds an offset in the audio token to associated with the pedestal and removes the offset to determine the encrypted audio token data, and decrypts the encrypted audio token data using a key to determine the audio token data. In an example, the broadcaster computing device 130 corrects the audio token data to account for phase shift. In an example, after performing the despreading operation, removing the offset, decrypting the audio token, and correcting the audio token to account for phase shift, the broadcaster computing device calculates a signal score of the received audio token comprising a measured energy value of the received audio token.

In another example, the broadcaster computing device 130 decodes all or part of the processed audio token data using a key and reads the decoded audio token data and determines the signal score based on the intelligibility of all or part of the decoded audio token data. For example, the broadcast encoded audio token data comprises a region with a six character sequence "An6Wp8," however, when the broadcaster computing device 130 applies the initial audio receiver configuration to process the audio token data and then the broadcaster computing device 130 decodes the processed audio token data, the broadcaster computing device 130 determines, from the decoded audio token data, a six character sequence "A ##Wp8," where the symbol # denotes an unintelligible character. In this example, the broadcaster computing device 130 successfully decoded four of six characters of the region of the processed audio token data and determines a signal score of 4/6=(0.67) for the initial audio receiver configuration. In an example, the broadcaster computing device 130 otherwise determines a signal score based on the received processed audio token data indicating a quality of the transmission of audio token data as received on the broadcaster computing device 130. In certain examples, a signal score comprises a value between zero and one.

In block 640, the broadcaster computing device 130 transmits processed audio token data and the determined signal score to the account management system 140. For example, the broadcaster computing device 130 transmits, to the account management system 140 via the network 120, the received audio token data processed according to the selected initial audio receiver configuration and the determined signal score. In an example, the broadcaster computing device transmits, to the account management system 140 via the network 120, an indication of the selected initial audio receiver configuration.

In block 650, the account management system 140 receives the processed audio token data and the determined signal score. For example, the account management receives the processed audio token data from the broadcaster computing device 130 via the network 120 and the indication of the selected initial audio receiver configuration.

In block 660, the account management system 140 stores the received signal score. In an example, the account management system 140 determines a model of the broadcaster computing device 130 and associates the signal score with the broadcaster computing device 130 identifier and the model. In an example, the account management system 140 stores, in a database for the model, the determined signal score associated with the broadcaster computing device 130 identifier and the initial audio receiver configuration. In certain examples, the account management system 140 logs a timestamp at the time the processed audio token data is received from the broadcaster computing device 130 and stores the logged timestamp along with the determined signal score associated with the broadcaster computing device 130 identifier and the initial audio receiver configuration in the database for the broadcaster computing device 130 model.

In block 670, the broadcaster computing device 130 determines whether additional audio receiver configurations other than the initial audio receiver configuration are available on the broadcaster computing device 130. For example, if the broadcaster computing device comprises two or more audio receiver configurations to apply to received audio token data and the broadcaster computing device 130 selected an initial one of the two or more audio receiver configurations, the broadcaster computing device 130 determines that one or more additional audio receiver configurations remain to apply to the received audio token data.

If the broadcaster computing device 670 determines that additional audio receiver configurations are available, the method 250 proceeds to block 680.

In block 680, the broadcaster computing device 130 randomly selects a subsequent audio receiver configuration. For example, the broadcaster computing device 130 comprises audio receiver configuration A, audio receiver configuration B, and audio receiver configuration C, and that the previously received and processed audio token data was processed according to audio receiver configuration A. In this example, the randomly selects between remaining audio receiver configurations B and C.

From block 680, the method 250 returns to block 620 and the broadcaster computing device 130 receives audio signal data from the broadcaster computing device 130 via the microphone component 139. In certain examples, the broadcaster computing device 130 and account management system 140 apply the method described in blocks 620, 630, 640, 650, 660, 670, and 680 to process audio token data broadcast by the broadcaster computing device 130 according to the subsequent audio receiver configuration. In an example, the broadcaster computing device 130 comprises two or more available subsequent audio receiver configurations and the broadcaster computing device 130 and the broadcaster computing device 130 and account management system 140 apply the methods described in blocks 620, 630, 640, 650, 660, 670, and 680 for each available subsequent audio receiver configuration on the broadcaster computing device 130. As a result, the account management system 140 stores a signal score for each available subsequent audio receiver configuration in a database for the broadcaster computing device 130 model. In an example, a broadcaster computing device 130 comprises six available audio receiver configurations and the account management system 140 stores a signal score for each of the six audio receiver configurations in the database for the broadcaster computing device 130 model. For example, the broadcaster computing device 130 comprises six audio receiver configurations 1, 2, 3, 4, 5, and 6 and the account management system 140 stores "broadcaster device A, signal score=0.8, configuration 1, 20 Nov. 2018 15:00:05," "broadcaster device A, signal score=1.0, configuration 2, 20 Nov. 2018 15:00:08," "broadcaster device A, signal score=0.2, configuration 3, 20 Nov. 2018 15:00:10," "broadcaster device A, signal score=0.67, configuration 4, 20 Nov. 2018 15:00:14," "broadcaster device A, signal score=0.05, configuration 5, 20 Nov. 2018 15:00:18," and "broadcaster device A, signal score=1.0, configuration 6, 20 Nov. 2018 15:00:20" in the database for the broadcaster computing device 130 model.

Returning to block 670, if the broadcaster computing device 130 determines that no remaining audio receiver configurations are available on the broadcaster computing device 130 for testing, the method 250 proceeds to block 690. For example, the broadcaster computing device 130 comprises a list of all available broadcaster computing device 130 audio receiver configurations and determines that additional audio receiver configurations other than the initial audio receiver configuration and any previously applied subsequent audio receiver configurations are not available on the broadcaster computing device 130. For example, if the broadcaster computing device 130 comprises two audio receiver configurations to apply to received audio token data and the broadcaster computing device 130 selected an initial audio receiver configuration and then subsequently selected the remaining audio receiver configuration as a subsequent audio receiver configuration, the broadcaster computing device 130 determines that no additional audio receiver configurations remain to apply to the received audio token data. In certain examples, in response to determining that no further audio receiver configurations are available to test, the broadcaster computing device 130 ceases to broadcast the audio token data via the speaker component.

In block 690, the account management system 140 sets a highest scoring audio receiver configuration as a default audio receiver configuration for receiver computing devices 110 of the same model as the broadcaster computing device 130 model. In an example, the account management system 140 receives processed audio token data from one or more broadcaster computing devices 130 of the same model for one or more audio receiver configurations and a respective signal score for each received processed audio token data. In an example, the broadcaster computing device 130 model comprises three audio receiver configurations 1, 2, and 3, the account management system 140 receives processed audio token data and signal scores for each of the three configurations from broadcaster computing devices A, B, and C. In an example, the account management system 140 stores data in the database for the broadcaster computing device 130 model comprising "broadcaster device A, signal score=0.9, configuration 1, 20 Nov. 2018 15:00:05," "broadcaster device B, signal score=1.0, configuration 1, 20 Nov. 2018 18:37:20," "broadcaster device C, signal score=0.95, configuration 1, 21 Nov. 2018 06:59:58," "broadcaster device A, signal score=0.2, configuration 2, 20 Nov. 2018 15:00:07," "broadcaster device B, signal score=0.3, configuration 2, 20 Nov. 2018 18:37:23," "broadcaster device C, signal score=0.4, configuration 2, 21 Nov. 2018 07:00:02," "broadcaster device A, signal score=0.5, configuration 3, 20 Nov. 2018 15:00:10," "broadcaster device B, signal score=0.55, configuration 3, 20 Nov. 2018 18:37:25," "broadcaster device C, signal score=0.6, configuration 3, 21 Nov. 2018 07:00:05," in the database for the broadcaster computing device 130 model.

In an example, the account management system 140 determines an average signal score for each audio receiver configuration available for the broadcaster computing device 130 model. In an example, for signal scores calculated based on audio token data received from three broadcaster computing devices 130, configuration 1 comprises an average signal score of 0.95, configuration 2 comprises an average signal score of 0.3, and configuration 3 comprises an average signal score of 0.55. In this example, the account management system 140 selects configuration 1 as a default audio receiver configuration for the broadcaster computing device 130 model. In other examples, the account management system 140 determines a median signal score for each audio receiver configuration available for the broadcaster computing device 130 model and selects an audio receiver configuration having a highest median signal score. In an example, the account management system 140, in response to determining the default audio receiver configuration for the broadcaster computing device 130 model, transmits, via the network 120, instructions to one or more receiver computing devices 110 and/or broadcaster computing devices 130 of the broadcaster computing device model to apply the default audio receiver configuration to future service requests involving reception of audio token data.

From block 690 the method 250 proceeds to block 260 in FIG. 2.

Returning to FIG. 2, in block 260, the receiver computing device 110 applies the default audio receiver configuration for the receiver computing device 110 model. For example, during a service request, in response to an input via the user interface 111, the receiver computing device 110 activates the microphone component 119 to receive audio token data broadcast by the broadcaster computing device 130. In an example, the receiver computing device 110 comprises a default audio receiver configuration associated with the receiver computing device 110 model to apply to received audio token data. In an example, the account management system 140 previously determined the default audio receiver configuration for the receiver computing device 110 by applying the methods described in blocks 610-690 of FIG. 6 for broadcaster computing devices 130 of the same model as the receiver computing device 110 to determine a default audio receiver configuration for the model having a highest signal score. In this example, the account management system 140 transmitted instructions to receiver computing devices 110 of the same model to set the default audio receiver configuration for future service requests involving audio pairing.

In block 270, the broadcaster computing device 130 and the receiver computing device 110 are paired and the service request is processed. Methods for pairing, by an account management system 140, a broadcaster computing device 130 and a receiver computing device 110 to process a service request are described in more detail hereinafter with reference to the methods described in FIGS. 7 and 8.

Figure 7:
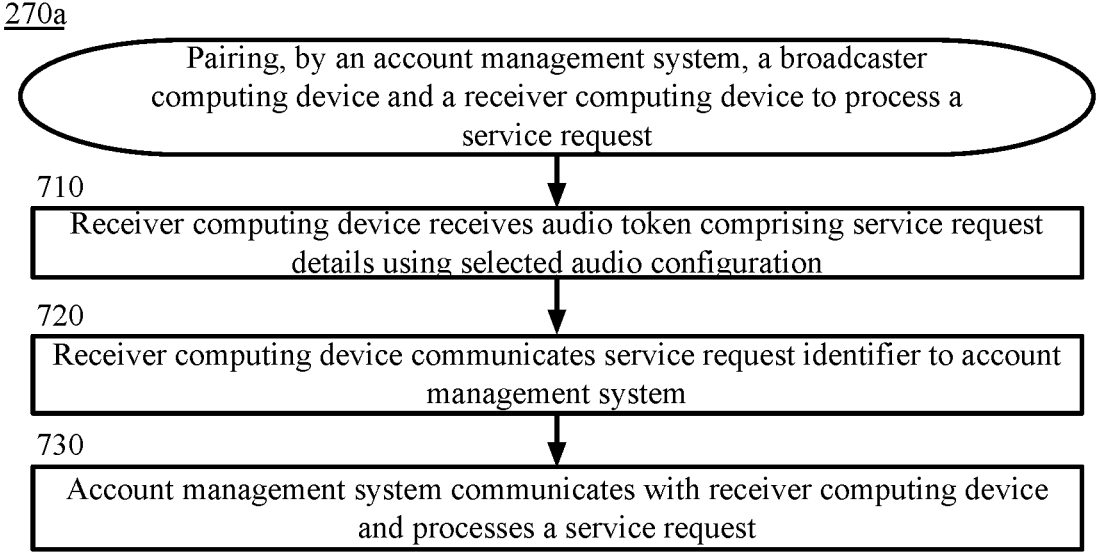
FIG. 7 is a block flow diagram depicting a method for pairing, by an account management system, a broadcaster computing device and a receiver computing device to process a service request, in accordance with certain examples.

FIG. 7 is a block diagram depicting a method 270a for pairing, by an account management system 140, a broadcaster computing device 130 and a receiver computing device 110 to process a service request, in accordance with certain examples. The method 270a is described with reference to the components illustrated in FIG. 1. In an example, pairing the broadcaster computing device 130 and the receiver computing device 110 comprises an account management system 140 associating the broadcaster computing device 130 with the service request identifier, the broadcaster computing device 130 broadcasting and audio token comprising the service request identifier that is received by the receiver computing device 110, and the account management system 140 receiving the service request identifier from the user computing device 110. Having associated the service request identifier with the broadcaster computing device 130 and having received the service request identifier from the receiver computing device 110, the account management system 140 identifies the broadcaster computing device 130 and receiver computing device 110 as being paired and facilitates transmission of data between the broadcaster computing device 110 and the receiver computing device 110 or processes a service request comprising information received from one or both of the receiver computing device 110 and the broadcaster computing device 130.

In block 710, the receiver computing device 110 receives the audio token comprising the service request identifier. For example, the microphone component 119 receives the audio token broadcast by the broadcaster computing device via ultrasound communication or audible sound communication and transmits the received audio token to the application 113 of the receiver computing device 110. In an example, the application 113 extracts the service request identifier from the received audio token. In another example, the receiver computing device 110 receives the token broadcast by the broadcaster computing device 130 via Bluetooth communication, via Bluetooth low-energy communication, via Wi-Fi communication, via light or optical communication, or via other appropriate transfer medium. In this example, the receiver computing device 110 receives the token broadcast by the broadcaster computing device 130 over a particular transfer medium via an activated component of the receiver computing device 110 capable of receiving data over the particular transfer medium.

In certain examples, in response to receiving an input via the user interface 111, the receiver computing device 110 opens or otherwise activates the application 113 on the receiver computing device 110. In this example, the application 113 displays a request to approve a service request. An example request to approve a service request comprises service request details received via the token broadcast from the broadcaster computing device 130. In an example, the request to approve the service request may comprise one or more objects on the user interface 111 that a user 101 may select to indicate approval or denial of the request to approve the service request. In an example, the user 101 selects, via the user interface 111, a user interface 111 object to indicate approval of the request to approve the service request and the receiver computing device 110 receives the indication of the user 101 approval of the service request. In another example, the user 101 selects, via the user interface 111, a user interface 111 object to indicate denial of the request to approve the service request and the receiver computing device 110 receives an input of an indication of the user 101 denial of the service request.

In block 720, the receiver computing device 110 communicates the service request identifier to the account management system 140. For example, the application 113 transmits the service request identifier to the account management system 140 via the network 120. In an example, the application 113 also transmits a user 101 account identifier for an account associated with the user 101 account maintained by the account management system 140 or transmits a receiver computing device 110 identifier associated with the receiver computing device 110. In this example, the user 101 account is associated with the receiver computing device 110 identifier.

In block 730, the account management system 140 communicates with the receiver computing device 110 and processes a service request. In an example, the account management system 140 identifies the user 101 account based on the received receiver computing device 110 identifier or the received user 101 account identifier. In an example, the account management system 140 identifies service request details and a service system account based on the received service request identifier. In an example, the account management system 140 extracts the service system account identifier and the service request details associated with the service request identifier from a database or in the data storage unit 146 accessible to the account management system 140. In an example, the account management system 140 identifies the total amount of service request from the service request details and identifies a service system account associated with the service system account. In an example, the account management system 140 identifies a user 101 account from the user 101 account. For example, the user 101 preconfigured an account to be used in service requests. In another example, the account management system 140 identifies two or more user 101 accounts from the user 101 account and transmits account information associated with the two or more user 101 accounts to the receiver computing device 110 via the network 120 along with a request for the user 101 to select a particular account for use in the service request. In this example, the receiver computing device 110 receives the account information and the request to select a particular account and displays information associated with the two or more accounts to the user 101 and provides two or more objects on the user interface 111 enabling the user 101 to select a particular account for use in the service request, each account associated with a respective user interface 111 object. In this example, the user 101 selects a particular user interface 111 object associated with a particular account of the user 101 and the receiver computing device 110 transmits an indication via the network 120 of the user 101 selection of the particular user interface 111 object. To the account management system 140. In this example, the account management system 140 receives the indication of the user 101 selection of the particular account.

In an example, the account management system 140 generates a service authorization request and transmits, via the network 120, the service authorization request to an issuer system associated with the account selected by the user 101 or the account extracted from the user 101 account and preconfigured for use in service request by the user 101. In an example, the service authorization request includes the total amount of the service request associated with the service request identifier, the service system account identifier associated with the service request identifier, and a user 101 account identifier associated with the user 101 account selected by the user 101 or preconfigured for use by the user 101 in service request. In an example, the issuer system receives the service authorization request via the network 120 and either approves or denies the service authorization request. In an example, the issuer system approves the service authorization request and transmits a notice of approval of the service authorization request or a notice of denial of the service authorization request to the account management system 140 in accordance with approving or denying the service authorization request. In an example, the account management system 140 receives a notice of approval of the service authorization request from the issuer system and transmits a receipt, via the network 120, to the receiver computing device 110 and/or the broadcaster computing device 130 indicating that the service request was successfully completed and comprising the service request details, information associated with the service system account used in the service request, and/or information associated with the user 101 account used in the service request. In another example, the account management system 140 receives a notice of denial of the service authorization request from the issuer system and transmits a receipt, via the network 120, to the user computing device and/or to the broadcaster computing device 130 indicating that the service authorization was denied. In an example, the receiver computing device 110 receives, via the network 120, the receipt information indicating a service authorization request approval or a service authorization request denial and displays all or part of the receipt information via the user interface 111 of the user computing device. In an example, the broadcaster computing device 130 receives, via the network 120, the receipt information indicating a service authorization request approval or a service authorization request denial and displays all or part of the receipt information via the user interface 131 of the broadcaster computing device 130

Figure 8:
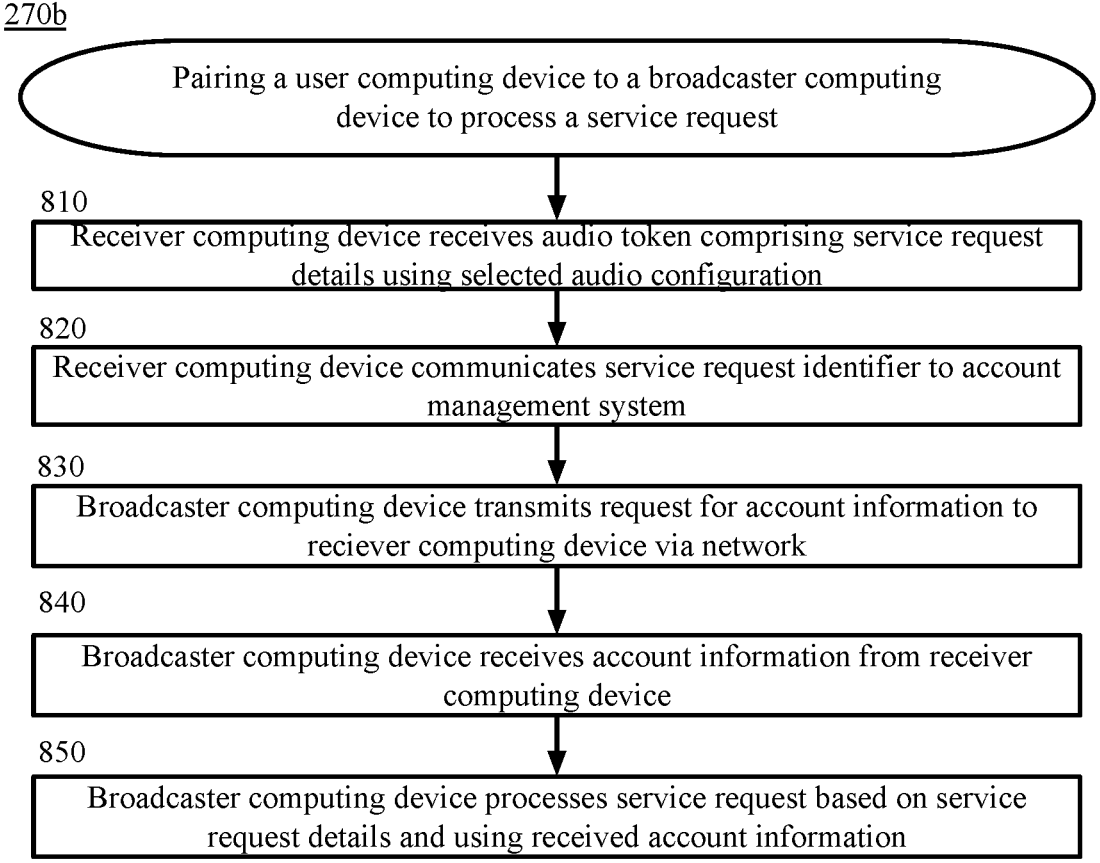
FIG. 8 is a block flow diagram depicting a method for pairing, by an account management system, a broadcaster computing device and a receiver computing device to process a service request, in accordance with certain examples.

FIG. 8 is a block diagram depicting a method 270b for pairing, by an account management system 140, a broadcaster computing device 130 and a receiver computing device 110 to process a service request, in accordance with certain examples. The method 260b is described with reference to the components illustrated in FIG. 1. In an example, pairing the broadcaster computing device 130 and the receiver computing device 110 comprises an account management system 140 associating the broadcaster computing device 130 with the service request identifier, the broadcaster computing device 130 broadcasting and audio token comprising the service request identifier that is received by the receiver computing device 110, and the account management system 140 receiving the service request identifier from the user computing device 110. Having associated the service request identifier with the broadcaster computing device 130 and having received the service request identifier from the receiver computing device 110, the account management system 140 identifies the broadcaster computing device 130 and receiver computing device 110 as being paired and facilitates transmission of data between the broadcaster computing device 110 and the receiver computing device 110 or processes a service request comprising information received from one or both of the receiver computing device 110 and the broadcaster computing device 130.

In block 810, the receiver computing device 110 receives the audio token comprising the service request details. For example, the application 113 receives the audio token broadcast by the broadcaster computing device via the microphone component 119. The example audio token is received via ultrasound communication or audible sound communication and transmits the received audio token to the application 113 of the receiver computing device 110. In an example, the application 113 extracts the service request identifier from the received audio token. In another example, the receiver computing device 110 receives the token broadcast by the broadcaster computing device 130 via Bluetooth communication, via Bluetooth low-energy communication, via Wi-Fi communication, via light or optical communication, or via other appropriate transfer medium. In this example, the receiver computing device 110 receives the token broadcast by the broadcaster computing device 130 over a particular transfer medium via an activated component of the receiver computing device 110 capable of receiving data over the particular transfer medium.

In block 820, the receiver computing device 110 communicates the service request identifier to the account management system 140. In an example, the receiver communicates all or part of the data from the received audio token to the account management system 140 via the network 120. In an example, the receiver computing device 110 decodes the received audio token and transmits all or part of the decoded data from the received audio token to the account management system 140.

In some examples, the receiver computing device 110, in response to receiving the audio token comprising the service request details, transmits a request, via ultrasound communication or other appropriate communication protocol, a request to establish a proximity network 120 connection with the broadcaster computing device 130. In this example, the broadcaster computing device 130 receives the request to establish the proximity network 120 connection and transmits a response to the receiver computing device 110 approving the request to establish a proximity network 120 connection. In an example, the receiver computing device 110 and the broadcaster computing device 130 may exchange cryptographic keys to enable encrypted communication. In an example, the broadcaster computing device 130 and the receiver computing device 110 establish a Wi-Fi network 120 connection, a Bluetooth network connection, a Bluetooth low-energy network connection, a light or optical network connection, an ultrasound network connection, an audio communication network (e.g., an ultrasound communication network), or other appropriate proximity network 120 connection between the devices. In other examples, the receiver computing device 110 and the broadcaster computing device 130 do not establish a network 120 connection and communicate via ultrasound or audible sound communication or via the same transfer medium used to transmit the token from the broadcaster computing device 130 to the receiver computing device 110.

In block 830, the broadcaster computing device 130 transmits a request for account information to the receiver computing device 110. For example, the broadcaster computing device 130 transmits the request for account information to the receiver computing device 110 via the network 120 communication channel established between the devices or transmits the request for account information via an audio token via ultrasound communication. In this example, the receiver computing device 110 receives the request for account information via the network 120 communication channel established between the devices or otherwise receives the request for information via an audio token via ultrasound communication. In another example, the broadcaster computing device 130 transmits data to the receiver computing device 110. For example, the broadcaster computing device 130 transmits images, text, files, or other data selected by the broadcaster computing device operator to the receiver computing device 110. In this example, in response to establishing a network connection between the receiver computing device 110, the broadcaster computing device 130 displays a request to select data for transmission to the receiver computing device 110. For example, the broadcaster computing device 130 may display a menu of user interface 131 objects associated with one or more images, files, text, or other data selectable by the operator of the broadcaster computing device 130 that enable the operator to indicate one or more data items the operator wishes to transmit to the receiver computing device 110. In this example, the broadcaster computing device 130 operator selects one or more of the user interface 131 objects and the broadcaster computing device 130 receives an indication of the selection of the one or more user interface 131 objects indicating one or more corresponding data items the operator wishes to transmit to the receiver computing device 110. In another example, the receiver computing device 110 receives, from the broadcaster computing device 130, one or more data items selected by the user 101 for transmission by the broadcaster computing device 130 to the receiver computing device 110. For example, the one or more data items comprise one or more of images, documents, files, text, or other data items.

In yet another example, the broadcaster computing device 130 transmits a request for data to the receiver computing device 110. For example, the broadcaster computing device 130 transmits a request for data comprising a request for the user 101 to select one or more data comprising one or more of images, documents, files, text, or other data for transmission from the receiver computing device 110 to the broadcaster computing device 130.

In block 850, the broadcaster computing device 130 receives the account information from the receiver computing device 110. In an example, the receiver computing device 110 displays the request for account information via the user interface 111 of the receiver computing device 110. In an example, the receiver computing device 110 displays, via the user interface 111, account information corresponding to an account of the user 101 preconfigured for use in service requests and displays a first user interface 111 object representing an option to accept the use of the preconfigured account information in the service request and a second user interface 111 object representing an option to reject the use of the preconfigured account information in the service request. In an example, the user 101 selects the user interface 111 object indicating acceptance of the use of the preconfigured account information in the service request. In this example, the receiver computing device 110 transmits an indication of the user 101 selection to accept the use of the preconfigured account information to the broadcaster computing device 130 via the network 120 communication channel established between the receiver computing device 110 and the broadcaster computing device 130 or otherwise via a sound token. In an example, the broadcaster computing device 130 receives the indication of the user 101 selection to accept the use of the preconfigured account information in the service request.

In another example, the receiver computing device 110 displays via the user interface 111, two or more account options associated with two or more corresponding accounts of the user 101 that are available for use in the service request and associated with the user 101 account with the account management system 140. In this example, the receiver computing device 110 displays, via the user interface 111, two or more user interface 111 objects corresponding to options to select any one of the two or more accounts of the user 101 for use in the service request. In this example, the user 101 selects a particular user interface 111 object via the user interface 111 corresponding to a particular account that the user 101 desires to use in the service request. In an example, the receiver computing device 110 transmits an indication of the selection of the particular account to the broadcaster computing device 130 and an account identifier associated with the selection. In another example, the receiver computing device 110 transmits an account number and account information associated with the user 101 selection of the particular account sufficient for the broadcaster computing device 130 to process a service request. For example, the receiver computing device 110 may transmit the account number, an expiration date, a billing address, a billing zip code, and/or other account information associated with the account. In this example, the user 101 may manually enter one or more account information such as a card verification code ("CVV") or a personal identification number ("PIN") via the user interface 111 to transmit along with the user's 101 stored account information. In yet another example, the user 101 manually enters account information into the user interface 111 to transmit to the broadcaster computing device 130.

In yet another example, the receiver computing device 110 receives, from the broadcaster computing device 130, a request for data. In this example, the receiver computing device 110 displays a request to select data for transmission to the broadcaster computing device 130. For example, the receiver computing device 110 may display a menu of user interface 111 objects associated with one or more images, files, text, or other data selectable by the user 101 that enable the user 101 to indicate one or more data items the user 101 wishes to transmit to the broadcaster computing device 130. In this example, the user 101 selects one or more of the user interface 111 objects and the receiver computing device 110 receives an indication of the selection of the one or more user interface 111 objects indicating one or more corresponding data items the user 101 wishes to transmit to the broadcaster computing device 130. In an example, in response to receiving a n indication of the selection of the one or user interface 111 objects indicating one or more corresponding data items, the receiver computing device 110 transmits the selected one or more corresponding data items to the broadcaster computing device 130. In this example, the broadcaster computing device 130 receives the one or more corresponding data items from the receiver computing device 110. In an example, the receiver computing device 110 transmits the selected corresponding data items to the broadcaster computing device 130 via a proximity network connection between the receiver computing device 110 and the broadcaster computing device 130. In another example, the receiver computing device 110 transmits the indicated of the selection of the corresponding data items to the account management system 140 via the network 120, the account management system 140 extracts information associated with the selected corresponding data items, and the account management system 140 transmits the extracted information associated with the selected corresponding data items to the broadcaster computing device 130 via the network 120.

In block 860, the broadcaster computing device 130 processes the service request based on the service request details and the receives account information. In an example, the broadcaster computing device 130 processes the service request using information received from the receiver computing device 110 via the network 120 communication channel established between the receiver computing device 110 and the broadcaster computing device 130. In this example, the broadcaster computing device generates a service authorization request comprising a total amount of the service request, account information of the user, and account information of the service system and transmits, via the network 120, the service authorization request to an issuer system associated with the user's 101 selected account or to an issuer system associated with the account information provided by the user 101 for use in the service request. In an example, the issuer system receives the service authorization request over the network 120 and approves or denies the service authorization request. The issuer system may transmit, over the network 120, a notice or denial of the service authorization request to the broadcaster computing device 130. The broadcaster computing device 130 may receive, over the network 120, the approval or denial of the service authorization request from the issuer system. In an example, the broadcaster computing device 130 displays a receipt via the user interface 131 of the broadcaster computing device 130 and/or transmits a receipt to the receiver computing device 110 via the network 120 communication channel between the broadcaster computing device 130 and the receiver computing device 110. For example, the receipt displays information in accordance with the approval or denial of the service authorization request. For example, if the service authorization request was approved, the receipt may show a listing of items, a total value, account information of the user, and/or any other relevant information concerning the completed service request. In another example, if the service authorization request was denied, the receipt may show a notice that the service request was declined.

In another example, the broadcaster computing device 130 provides an account identifier received from the receiver computing device 110 and retransmits the account identifier along with the service request details and the broadcaster computing device 130 identifier. In this example, the account management system 140 processes the service request. The account management system 140 may determine user 101 account information associated with the received user 101 account identifier. For example, the user 101 account identifier identifies a particular account in a user 101 account managed by the account management system 140 and comprising the user 101 account information. The account management system 140 may determine service system account information associated with the received broadcaster computing device 130 identifier. For example, the broadcaster computing device 130 identifier identifies a service system account managed by the account management system 140 and comprising the service system account information. In this example, the account management system 140 generates a service authorization request comprising a total amount of the service request derived from the service request details received from the broadcaster computing device 130, account information of the user, and account information of the service system. In this example, the account management system 140 transmits, via the network 120, the service authorization request to an issuer system associated with the user's 101 selected account or to an issuer system associated with the account information provided by the user 101 for use in the service request. In an example, the issuer system receives the service authorization request over the network 120 and approves or denies the service authorization request. The issuer system may transmit, over the network 120, a notice or denial of the service authorization request to the account management system 140, which forwards the notice to the broadcaster computing device 130 and/or the receiver computing device 110. The broadcaster computing device 130 and/or the receiver computing device 110 may receive, over the network 120, the approval or denial of the service authorization request from the issuer system. In an example, the broadcaster computing device 130 displays a receipt via the user interface 131 of the broadcaster computing device 130 and/or transmits a receipt to the receiver computing device 110 via the network 120 communication channel between the broadcaster computing device 130 and the receiver computing device 110. For example, the receipt displays information in accordance with the approval or denial of the service authorization request. For example, if the service authorization request was approved, the receipt may show a listing of items, a total value, account information of the user, and/or any other relevant information concerning the completed service request. In another example, if the service authorization request was denied, the receipt may show a notice that the service request was declined.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to calibrate audio receiver modes in computing devices, comprising, by a first computing device:
   broadcasting audio token data via a speaker component of the first computing device;
   selecting a first audio receiver configuration from two or more audio receiver configurations;
   receiving, at a first time, the audio token data via a microphone component;
   in response to receiving the audio token data at the first time;
   preprocessing the received audio token data by applying the selected first audio receiver configuration;
   decoding the audio token data preprocessed according to the selected first audio receiver configuration;
   determining a first signal score based on the decoded audio token data preprocessed according to the selected first audio receiver configuration;
   determining a second audio receiver configuration from two or more audio receive confirmation, wherein the second audio receive configuration is different from the first audio receive configuration;
   in response to receiving the audio token data a second time:
   preprocessing the received audio token data by applying the second audio receiver configuration;
   decoding the audio token data preprocessed according to the second audio receiver configuration; and
   determining a second signal score based on the decoded audio token data preprocessed according to the second audio receiver configuration;
   selecting, from among the first and second signal scores, a highest signal score;
   determining an audio receiver configuration associated with the selected highest signal score as a default audio receiver configuration for the model; and
   transmitting the default audio receive configuration to one or more computing devices.

2. The computer-implemented method of claim 1, further comprising, by the first computing device:
   selecting a second audio receiver configuration different from the first audio receiver configuration from the two or more audio receiver configurations;
   receiving, at a second time later than the first time, the audio token data via the microphone component;
   in response to receiving the audio token data at the second time;
   preprocessing the received audio token data by applying the selected second audio receiver configuration;
   decoding the audio token data preprocessed according to the selected second audio receiver configuration; and
   determining a second signal score based on the decoded audio token data preprocessed according to the selected second audio receiver configuration; and
   transmitting the determined second signal score and the audio token data to the one or more computing devices.

3. The computer-implemented method of claim 1, further comprising, by the one or more computing devices:
   receiving, from the first computing device via a network, the audio token data, the audio token data comprising a request identifier;
   decoding the received audio token data to determine the request identifier;
   receiving, from a second computing device via the network, the request identifier, the second computing device receiving, via a microphone component, the audio token data broadcast by the first computing device, decoding the audio token data to determine the request identifier, and transmitting the request identifier to the one or more computing devices;
   identifying the first computing device based on the received request identifier; and
   facilitating communication between the first computing device and the second computing device via the network.

4. The computer-implemented method of claim 1, wherein determining the first signal score comprises, by the first computing device:
   extracting a first region of the decoded audio token data preprocessed according to the selected first audio receiver configuration comprising a predetermined number of characters;
   determining a number of intelligible characters in the first region; and
   determining the first signal score based on the number of intelligible characters in the first region.

5. The computer-implemented method of claim 2, wherein determining the second signal score comprises, by the first computing device:
   extracting a first region of the decoded audio token data preprocessed according to the selected second audio receiver configuration comprising a predetermined number of characters;
   determining a number of intelligible characters in the first region; and
   determining the second signal score based on the number of intelligible characters in the first region.

6. The computer-implemented method of claim 1, further comprising, by the first computing device:
   receiving an input via a user interface of the first computing device, wherein the audio token data is broadcast by the first computing device in response to receiving the input.

7. The computer-implemented method of claim 1, wherein the first audio receiver configuration mode includes applying one or more of an anti-aliasing filter, a noise canceller, an automatic gain controller, and an acoustic echo canceller.

8. One or more non-transitory computer-readable media that store instructions that when executed by one or more processors cause the one or more processors to perform operations, the operations comprising:

receiving, from each of one or more broadcaster computing devices of a device model, audio token data and two or more signal scores, wherein each of the two or more signal scores is associated with a respective audio receiver configuration of at least a first and a second audio receiver configurations available to the device model;
determining, for each audio receiver configuration among at least the first and second audio receiver configurations available to the device model, a respective average signal score comprising an average of one or more of the one or more received signal scores associated with the respective audio receiver configuration;
selecting, from among at least the first and second audio receiver configurations for which average signal scores are determined, an audio receiver configuration having the highest average signal score as a standard audio receiver configuration for the device model; and
communicating, to one or more computing devices of the device model, instructions to set the determined standard audio receiver configuration for the device model as a default audio receiver configuration for the respective computing device.

9. The one or more non-transitory media of claim 8, wherein the default audio receiver configuration includes applying one or more of an anti-aliasing filter, a noise canceller, an automatic gain controller, and an acoustic echo canceller.

10. The one or more non-transitory media of claim 8, wherein the audio token data received from each of the one or more broadcaster computing devices of the device model is broadcasted by the respective broadcaster computing device via ultrasound communication, received by the respective broadcaster computing device.

11. The one or more non-transitory media of claim 8, wherein the audio token data received from each of the one or more broadcaster computing devices of the device model comprises a respective request identifier, and wherein the operations include for each of the one or more broadcaster computing devices of the device model:
  decoding the respective received audio token data received from the first computing device to determine the respective request identifier;
  receiving from a respective second computing device via the network, the request identifier, the second computing device receiving, via a microphone component of the second computing device, the audio token data broadcast by the broadcaster computing device, and decoding the audio token data to determine the request identifier;
  identifying the broadcaster computing device based on the received request identifier; and
  facilitating communication between the first computing device and the second computing device via the network.

12. A system to calibrate audio receiver modes in computing devices, comprising:
  a storage device;
  a speaker component;
  a microphone component; and
  a processor communicatively coupled to the storage device, the speaker component, and the microphone component, wherein the processor executes instructions that are stored in the storage device to cause the system to:
    broadcast an audio token data via a speaker component;
    randomly select a first audio receiver configuration from two or more available audio receiver configurations;
    receive, at a first time, the audio token data via the microphone component;
    in response to receiving the audio token data at the first time;
    preprocess the received audio token data applying the selected first audio receiver configuration;
    decode the audio token data preprocessed according to the selected first audio receiver configuration; and
    determine a first signal score based on the decoded audio token data preprocessed according to the selected first audio receiver configuration;
    determine a second audio receiver configuration from two or more audio receive confirmation, wherein the second audio receive configuration is different from the first audio receive configuration;
    in response to receiving the audio token data a second time;
    preprocess the received audio token data by applying the second audio receiver configuration;
    decode the audio token data preprocessed according to the second audio receiver configuration; and
    determine a second signal score based on the decoded audio token data preprocessed according to the second audio receiver configuration;
    selecting, from among the first and second signal scores, a highest signal score;
    determine an audio receiver configuration associated with the selected highest signal score as a default audio receiver configuration for the model; and
    transmit the default audio receive configuration to one or more computing devices.

13. The system of claim 12, wherein the first audio receiver configuration mode includes applying one or more of an anti-aliasing filter, a noise canceller, an automatic gain controller, and an acoustic echo canceller.

14. The system of claim 12, wherein the processor is further configured to execute instructions stored in the storage device to cause the system to:
  select a second audio receiver configuration different from the first audio receiver configuration from the two or more available audio receiver configurations;
  receive, at a second time later than the first time, the audio token data via the microphone component;
  in response to receiving the audio token data at the second time;
  preprocess the received audio token data applying the selected second audio receiver configuration;
  decode the audio token data preprocessed according to the selected second audio receiver configuration; and
  determine a second signal score based on the decoded audio token data preprocessed according to the selected second audio receiver configuration; and
  transmit the determined second signal score and the audio token data to the one or more computing devices.

15. The system of claim 12, wherein determining the first signal score comprises:
  extracting a first region of the decoded audio token data preprocessed according to the selected first audio receiver configuration comprising a predetermined number of characters;
  determining a number of intelligible characters in the first region; and
  determining the first signal score based on the number of intelligible characters in the first region.

16. The system of claim 14, wherein determining the second signal score comprises:
- extracting a first region of the decoded audio token data preprocessed according to the selected second audio receiver configuration comprising a predetermined number of characters;
- determining a number of intelligible characters in the first region; and
- determining the second signal score based on the number of intelligible characters in the first region.

17. The system of claim 12, wherein the processor is further configured to execute instructions to receive an input via a user interface, wherein the audio token data is broadcast by the first computing device in response to receiving the input.

18. The system of claim 12, wherein the first audio receiver configuration comprises one or more of a camcorder configuration, a voice recognition configuration, a voice recorder configuration, a cellular configuration, and a VoIP call configuration.

19. The system of claim 12, wherein the audio token data is broadcasted via ultrasound communication.

\* \* \* \* \*